US012668522B2

(12) United States Patent　　(10) Patent No.: US 12,668,522 B2
Gross et al.　　　　　　　　　　(45) Date of Patent: Jun. 30, 2026

(54) GLASSES AND GLASS-CERAMICS AND METHODS OF MAKING THEM

(71) Applicant: CORNING INCORPORATED, Corning, NY (US)

(72) Inventors: Timothy Michael Gross, Painted Post, NY (US); Alexandra Lai Ching Kao Andrews Mitchell, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 1128 days.

(21) Appl. No.: 17/708,096

(22) Filed: Mar. 30, 2022

(65) Prior Publication Data

US 2022/0289617 A1　　Sep. 15, 2022

Related U.S. Application Data

(63) Continuation of application No. 17/384,085, filed on Jul. 23, 2021, now Pat. No. 11,319,239.

(60) Provisional application No. 63/222,462, filed on Jul. 16, 2021, provisional application No. 63/088,525, filed on Oct. 7, 2020.

(51) Int. Cl.
　　*C03C 3/062*　　　(2006.01)
　　*C03C 3/16*　　　(2006.01)
　　*C03C 10/00*　　　(2006.01)
(52) U.S. Cl.
　　CPC ................. *C03C 3/062* (2013.01); *C03C 3/16* (2013.01); *C03C 10/00* (2013.01); *C03C 2201/28* (2013.01); *C03C 2201/40* (2013.01); *C03C 2204/02* (2013.01)
(58) Field of Classification Search
　　CPC ........... C03C 3/062; C03C 3/16; C03C 10/00; C03C 2204/02
　　See application file for complete search history.

(56) References Cited

U.S. PATENT DOCUMENTS

| | | | |
|---|---|---|---|
| 3,901,718 A | 8/1975 | Wu | |
| 4,226,628 A | 10/1980 | Works | |
| 4,229,220 A * | 10/1980 | Hirota | C03C 3/17 |
| | | | 501/46 |
| 4,407,786 A * | 10/1983 | Drake | C03C 3/17 |
| | | | 501/24 |
| 5,286,683 A * | 2/1994 | Aitken | C03C 3/16 |
| | | | 501/48 |
| 11,319,239 B2 * | 5/2022 | Gross | C03C 3/062 |
| 11,339,084 B2 | 5/2022 | Gross et al. | |
| 2006/0172877 A1 * | 8/2006 | Fechner | A01N 59/16 |
| | | | 501/48 |
| 2013/0104980 A1 | 5/2013 | Sridharan et al. | |
| 2015/0321942 A1 | 11/2015 | Masuda et al. | |
| 2017/0349876 A1 | 12/2017 | Deng et al. | |
| 2021/0108077 A1 | 4/2021 | Berleue et al. | |

| | | | |
|---|---|---|---|
| 2021/0355021 A1 | 11/2021 | Mitchell et al. | |
| 2021/0371326 A1 | 12/2021 | Mitchell | |
| 2022/0184926 A1 | 6/2022 | Cleary et al. | |

FOREIGN PATENT DOCUMENTS

| | | |
|---|---|---|
| CN | 101058478 A | 10/2007 |
| CN | 102939271 A | 2/2013 |
| CN | 106536435 A | 3/2017 |
| CN | 109195927 A | 1/2019 |
| JP | 2001-064036 A | 3/2001 |
| JP | 2001-064524 A | 3/2001 |
| JP | 2001-199740 A | 7/2001 |
| JP | 2019-151539 A | 9/2019 |
| WO | 94/19415 A1 | 9/1994 |
| WO | 2021/211284 A1 | 10/2021 |
| WO | 2022/125422 A1 | 6/2022 |
| WO | 2022/155028 A1 | 7/2022 |
| WO | 2022/177797 A1 | 8/2022 |

OTHER PUBLICATIONS

Chen et al. Porous glass-ceramics derived from MgO—CuO—TiO2—P2O5 glasses with different additions of Fe2O3. Ceramics International 46 (2020) 6560-6566, Available online Nov. 17, 2019. (Year: 2020).*

Shih et al., "Thermal and corrosion behavior of P2O5—Na2O—CuO glasses", Journal of non-crystalline solids, vol. 224, No. 2, Mar. 1, 1998, pp. 143-152 (Year: 1998).*

Bae et al., "Chemical Durability of Copper Phosphate Glasses", Glass Technology, Society of Glass Technology, vol. 35, No. 2, Apr. 1, 1994, pp. 83-88.

Chen et al. Porous glass-ceramics derived from MgO—CuO—TiO2—P2O5 glasses with different additions of Fe2O3. Ceramics International 46 (2020) 6560-6566.

Doweidar et al., "CuO—B2O3 glasses: Properties and formation conditions", European Journal of Glass Science and Technology Part B Physics and Chemistry of Glasses, vol. 57, No. 2, 2016, pp. 77-84.

Doweidar et al., "CuO—B2O3 glasses: properties and formation conditions", Physics and Chemistry of Glasses, European Journal of Glass Science and Technology Part B vol. 57 No. Apr. 2, 2016, pp. 77-84.

Elbashar et al., "Optical spectroscopic analysis of Fe2O3doped CuO containing phosphate glass", Optical and Quantum Electronics, vol. 49, No. 9, 2017, pp. 1-13.

Gabrovski et al., "Glass Formation Range of Some Tri-Component Phosphate, Boron-Phosphate and Molybdenum-Borate Systems", Yearbook of the Higher Institute of Chemical Technology, Burgas, vol. 12, No. 1, 1977, 16 pages (8 pages of English Translation and 8 pages of Original Document).

Gabrovski Kh., Obretenov Ts., Glass forming area of some ternary phosphate, boron-phosphate, and molybdenum borate systems (in Russian), God.Vissh.Khim.Tekhnol.Inst., Burgas, 1977, vol. 12, No. 1, p. 199-205.

(Continued)

*Primary Examiner* — Elizabeth A. Bolden

(74) *Attorney, Agent, or Firm* — Russell S. Magaziner

(57) ABSTRACT

Phosphate glasses and glass-ceramics exhibit a positive percent kill as measured by United States EPA Test Method for Efficacy of Copper Alloy Surfaces as a Sanitizer and/or have a CIELAB L* value below 35, CIELAB a* and b* values within 5 of zero.

20 Claims, 32 Drawing Sheets

(56) References Cited

OTHER PUBLICATIONS

Invitation to Pay Additional Fees; PCT/US2021/053781; dated Jan. 31, 2022; 10 pages; European Patent Office.

Shih et al. Thermal and corrosion behavior of $P_2O_5$—$Na_2O$—CuO glasses. Journal of Non-Crystalline Solids 224 (1998) 143-152.

Shih et al., "Thermal and corrosion behavior of $P_2O_5$-$Na_2O$—CuO glasses", Journal of Non-Crystalline Solids, vol. 224, No. 2, Mar. 1, 1998, pp. 143-152.

* cited by examiner

10 μm black
coloring

10 µm 400 nm

5 μm

25 μm

25 µm

25μm

25μm

25μm

25μm

Example L 100 nm

Example M 100 nm

[1582442.RAW] 905BKC FISHER MELT 1050C 1.5 HR SELF ANNEALED IN AIR IN GRAPHITE PREHEATED AT 300

FIG. 18C

Example N 100 nm

[1582443.RAW] 905BKD FISHER MELT 1050C 1.5 HR SELF ANNEALED IN AIR IN GRAPHITE PREHEATED AT 300

FIG. 19C

GLASSES AND GLASS-CERAMICS AND METHODS OF MAKING THEM

PRIORITY

This application is a continuation of U.S. Application No. 17,384,085 filed Jul. 23, 2021, which claims priority to U.S. Application Nos. 63/222,462 filed Jul. 16, 2021 and 63/088, 525 filed Oct. 7, 2020, each of which is incorporated by reference herein in its entirety.

BACKGROUND

Aspects of the present disclosure generally relate to unique glass and glass-ceramic compositions that have anti-microbial properties or other beneficial attributes. Other aspects include materials that include such glasses and glass-ceramics as well as unique products including such glasses and glass-ceramics. Still other aspects include method of making such glasses, glass-ceramics, materials, and products.

Antimicrobial glass-ceramics can be integrated in products, such as architectural articles, such as panels, plates, buttons, and other articles to help control transmission of illness or for other reasons. In other products, such glass-ceramics may be ground into fine particles or frit and added to composite mixtures, such as exterior paints, to control growth of mildew or other microbes that may degrade coloring. Applicants believe that conventional antimicrobial glass-ceramics typically include cuprite crystals, which may inhibit microbes, but may be difficult to machine and/or may have a burnt orange color that limits use of the glass-ceramics in mixtures or arrangements of desired colors that are incompatible with burnt orange. Applicants believe a need exists for unique materials, such as glasses and glass-ceramics that have antimicrobial properties and/or are convenient to machine into products and/or allow unique mixtures or arrangements of antimicrobial materials and products in new or desired colors.

SUMMARY

Applicants discovered unique compositions and uses of glass-ceramics, some of which include antimicrobial properties. Further, Applicants discovered compositions and uses of amorphous glasses, some of which include single-phase glasses, and some of which include antimicrobial properties. The glasses may be easier to machine than conventional antimicrobial glass-ceramics. Furthermore, some of the glasses and glass-ceramics are not burnt orange in color, allowing for use of the glasses and glass-ceramics in different products, such as new colored antimicrobial paints and architectural articles, such as push-plates.

Aspects of the disclosure include material comprising, in terms of constituent components over 30 mol % $P_2O_5$, at least 25 mol % CuO, and a positive amount of $Fe_2O_3$ up to 35 mol %. Other aspects include material comprising a positive amount of $P_2O_5$ up to 70 mol %, over 30 mol % CuO, and a positive amount of $Fe_2O_3$ up to 35 mol %. Still other aspects include a phosphate glass comprising copper and/or iron, wherein $P_2O_5$, $Fe_2O_3$, and CuO constituents in combination with one another make up over 50 mol % of the phosphate glass, and where the phosphate glass is fully amorphous and single phase. In embodiments, the phosphate glass exhibits a positive percent kill as measured by the United States Environmental Protection Agency (EPA) Test Method for Efficacy of Copper Alloy Surfaces as a Sanitizer test disclosed herein and/or has a CIELAB L* value below 35, CIELAB a* and b* values within 5 of zero. Further aspects include a method of making a product including melting a batch mixture comprising 40 to 55 mol % CuO, 5 to 10 mol % $Fe_2O_3$, and 35 to 50 mol % $P_2O_5$, fining the mixture; and cooling below 200° C.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE FIGURES

The accompanying Figures are included to provide a further understanding and are incorporated in and constitute a part of this specification. The drawings illustrate one or more embodiments, and together with the Detailed Description explain principles and operations of the various embodiments. As such, the disclosure will become more fully understood from the following Detailed Description, taken in conjunction with the accompanying Figures, in which:

FIG. 18C is an x-ray diffraction diagram of the material of FIGS. 18A and 18B.

FIG. 19C is an x-ray diffraction diagram of the material of FIGS. 19A and 19B.

DETAILED DESCRIPTION

Before turning to the following Detailed Description and Figures, which illustrate embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1:
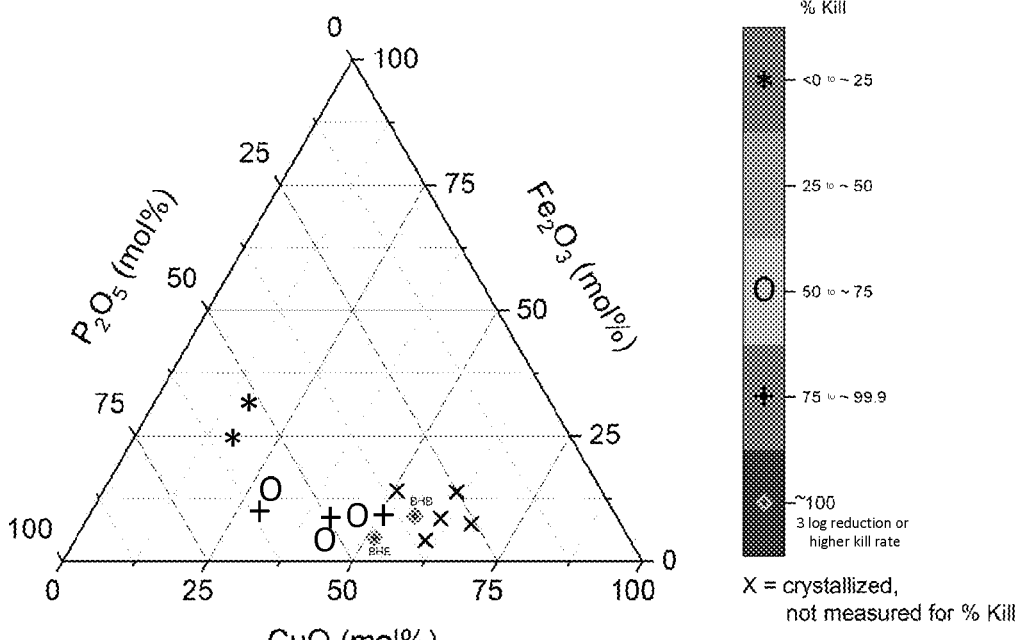
FIG. 1 is ternary diagram including data according to exemplary embodiments.

Referring to FIG. 1, constituents in the $P_2O_5$—$Fe_2O_3$—CuO ternary space may be mixed together, melted, fined, cooled, annealed, and otherwise processed (e.g., formed into sheets by float or fusion) to form materials, such as glasses, glass-ceramics, and conceivably ceramics or crystals. Notably materials of FIGS. 2-5 are present in the diagram in FIG. 1. In embodiments, the materials may have other constituents, such as contaminants or additives to facilitate manufacturing. According to exemplary embodiments, the materials are or include phosphate glasses, where the glass-forming substrate is $P_2O_5$, as opposed to silicate glasses, but in embodiments the materials may optionally include at least some silica. The materials may be crystalline in embodiments, such as over 90% crystalline, or may be amorphous glass in contemplated embodiments. The materials may be dense in embodiments, such as over 90% dense, or may be porous in contemplated embodiments.

Figure 2:
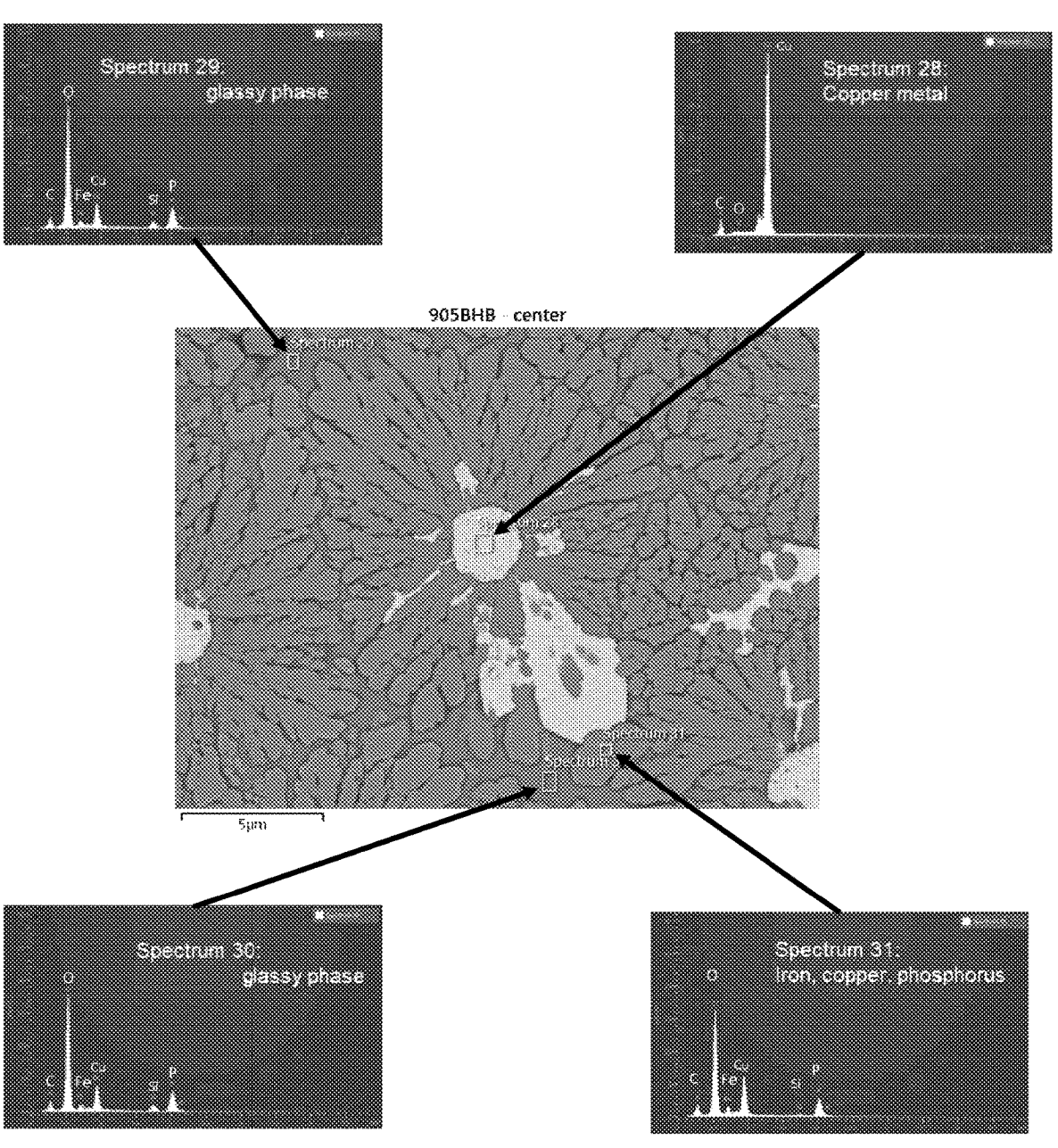
FIG. 2 is a scanning electron microscope image of a material surface surrounded by x-ray diffraction diagrams for locations on the image according to exemplary embodiments.

More specifically, according to exemplary embodiments the materials are or include phosphate glasses, where constituents in percentage of total moles (mol %) include at least 10 mol % $P_2O_5$, such as at least 15 mol %, and preferably in embodiments at least 25 mol % such as for improved antimicrobial properties, such as at least 30 mol %, such as at least 35 mol %, and/or no more than 75 mol %, such as no more than 63 mol %, and preferably in embodiments no more than 50 mol % $P_2O_5$ such as for improved antimicrobial properties. In embodiments, phosphorus is present in the material as identified by x-ray diffraction, such as is shown in FIG. 2 for example. In contemplated embodiments, materials may have less than 15 mol % $P_2O_5$, such as none, or more than 75 mol %.

For clarity, mol % ranges herein refer to mol % as batch constituents, as analyzed such as by inductively coupled plasma mass spectroscopy, and as analyzed with silica normalized out (see Table 1 below for example) unless specified otherwise, but the mol % ranges claimed herein by default are as analyzed unless otherwise specified. Also all ranges disclosed herein as closed sets (e.g., at least X, no more than Y) also include and may be rewritten as open sets (e.g., more than X, less than Y), where boundary values are excluded in the range, or mixed sets where either boundary value is or is not included in the range.

According to exemplary embodiments, constituents in percentage of total moles (mol %) include at least some $Fe_2O_3$, such as at least more than trace amounts, such as at least 1 mol %, at least 2 mol %, at least 2.5 mol %, and preferably in embodiments at least 5 mol % such as for improved antimicrobial properties, and/or no more than 50 mol %, such as no more than 38 mol %, and preferably in embodiments no more than 25 mol % $Fe_2O_3$ such as for improved antimicrobial properties, such as no more than 15 mol %, such as no more than 13 mol %, such as no more than 10 mol %. In embodiments, iron is optionally present in the material as identified by x-ray diffraction, such as is shown in FIG. 2 for example. In contemplated embodiments, materials may have no $Fe_2O_3$ or more than 50 mol %.

According to exemplary embodiments, constituents in percentage of total moles (mol %) include at least 15 mol % CuO, such as at least 25 mol %, at least 30 mol %, at least 33 mol %, and preferably in embodiments at least 40 mol % such as for improved antimicrobial properties, and/or no more than 88 mol %, such as no more than 80 mol %, and preferably in embodiments no more than 75 mol % such as for improved antimicrobial properties, such as no more than 70 mol %, such as no more than 60 mol %, such as no more than 55 mol %. In embodiments, copper is present in the material as identified by x-ray diffraction, such as is shown in FIG. 2 for example. In contemplated embodiments, materials may have less than 15 mol % CuO, such as none, or more than 88 mol %.

According to exemplary embodiments, materials are or are mostly ternary in that the $P_2O_5$, $Fe_2O_3$, and CuO constituents in combination with one another make up the majority of the mixture (e.g., batch mixture, or as analyzed), such as more than 50 mol %, such as at least 75 mol %, at least 85%, at least 90%, but in contemplated embodiments the $P_2O_5$, $Fe_2O_3$, and CuO constituents in combination may optionally comprise less than 50 mol % and/or up to 100 mol %.

In embodiments, the materials are antimicrobial, where the material, or a surface of the material will kill or inhibit growth of microbes including bacteria, viruses, and/or fungi, but not necessarily that the material or the surface of the material will kill or inhibit the growth of all species microbes within such families (e.g., *Staphylococcus aureus*, *Enterobacter aerogenes*, and *Pseudomonas aeruginosa*), but that it will kill or inhibit the growth or one or more species of microbes from such families. Further, the data in FIG. 1 indicates kill rates that may be expressed as "log reduction" i.e. log ($C_a/C_0$), where $C_a$ is the colony form unit (CFU) number of the antimicrobial surface and $C_0$ is the CFU of the control surface that is not an antimicrobial surface.

Embodiments of materials, glass, glass-ceramics, and products disclosed herein exhibit a kill rate of greater than 0, such as 25% or more, such as 50% or more, such as 75% or more, such as at least 99.9% (or a log reduction of 3 or greater) within 2 hours of exposure to *Staphylococcus aureus* under U.S. EPA Test Method for Efficacy of Copper Alloy as a Sanitizer testing conditions (see https://archive.epa.gov/pesticides/oppad001/web/pdf/copper-copper-alloy-surface-protocol.pdf, incorporated by reference) as implemented below.

Bactericidal efficacy tests including study controls were performed as described in the EPA test for efficacy of copper alloy surfaces as a sanitizer. The test material (e.g. glass) coupons were prepared as 25 mm×25 mm×1 mm coupons with polished surfaces. A 7 mil (0.007 inch, 0.1778 mm) wet film thickness drawdown bar was used to form films onto Leneta Scrub Charts (P121-10N). The films were dried for 2 days at ambient lab temperature (approximately 25° C.) before the antimicrobial test was conducted. Dry film thickness was around 80 μm. Stainless steel carriers, used as reference, were cleaned and sterilized by immersion in a 75% ethanol solution followed by rinsing with deionized water. Vials containing *Staphylococcus aureus* (ATCC 6538) bacterial stock culture were stored at −80° C. until use. 20 μL aliquots of thawed bacterial cultures were added to 10 mL of Tryptic Soy Broth (Teknova). These bacterial suspensions were serially incubated 3 times at 36° C. for 18-24 hours in an orbital shaker (New Brunswick Scientific), and then 1 time in polypropylene snap tubes (Fisher Healthcare)

for 48 hours. Cultures were subsequently mixed on a vortex mixer (VWR Scientific) and allowed to settle. The upper two thirds of suspension from each tube was aspirated and OD600 was measured (Smart Spec Spectrophotometer 3000, Bio-Rad) to estimate bacterial density. The culture was diluted with phosphate buffer saline (Gibco Life Technologies) to achieve a bacterial inoculum concentration near a target value of $1.0×10^7$ CFU/mL. 0.25 mL of 5% fetal bovine serum (Gibco Life Technologies) and 0.05 mL Triton X-100 (Amresco Pro Pure) were added to 4.70 mL bacterial suspension to aid in spreading the inoculum. Each test coupon was inoculated with 20 μL of the bacterial test culture. The inoculum volume was spread evenly using bent sterile pipette tips (Mettler-Toledo) to ensure full and even coverage, spreading as close to the edge of the coupon as possible. Coupons were then incubated in a controlled environment set at 42% relative humidity and 23° C. for a period of 120 min. Following the 120-minute exposure period, coupons were neutralized in Letheen broth (Gen Lab). Ten-fold serial dilutions of the neutralized solutions were plated using standard spread plate technique on Tryptic Soy Agar plates and incubated for 24 hours at 36° C. to yield countable numbers of survivors (approximately 20-200 colonies per plate). Log and percentage of reductions for bactericidal efficacy tests measure differences in CFUs between stainless steel and test material (e.g., glass) containing coupons. For the surface to be considered a sanitizer, a greater than or equal to 99.9% reduction (at least 3 log reduction) must be demonstrated.

According to exemplary embodiments, both glass and glass-ceramic materials disclosed herein were sanitizers. As an example, a 3 log reduction equals about 99.9% of the microbes killed, shown as a diamond in the ternary diagram of FIG. 1 and identified as "BHB" and "BHE." Other samples in the ternary had antimicrobial properties, with kill rates above zero and less than 25% (asterisk in FIG. 1) kill rates between 50 and 75% (letter "O" in FIG. 1), and between 75 and 99.9% (plus symbol in FIG. 1). Put another way, compositions in the $Fe_2O_3$—CuO—$P_2O_5$ ternary system are disclosed herein that display a range of antimicrobial behavior from virtually no effect to full kill. In embodiments, the materials can be fully amorphous and/or single-phase materials, or phase-separated and/or partially crystalline. Compositions with particularly effective antimicrobial properties (e.g., 3 log reduction or better) are shown in the ternary and include, in terms of % mol constituents, 40 to 55 CuO, 5 to 10 $Fe_2O_3$, and 35 to 50 $P_2O_5$, some of which are fully amorphous, single-phase glass and others of which are phase separated glass and/or glass-ceramic.

Amorphous microstructure may be is advantageous for applications that require bulk parts because machining may be much easier than for compositions that are surface-nucleated glass-ceramics. Such bulk parts may include architectural products, such as push plates on doors and other high-touch areas in hospitals, schools, and office buildings. Furthermore, compositions of the ternary of FIG. 1 are black, though some are burnt orange. Black color may be an advantage for applications that require bulk parts. Still further, compositions disclosed herein, such as those of the ternary of FIG. 1 are phosphate glasses, but surprisingly Applicants have discovered the materials can be formed and machined under normal atmospheric conditions (e.g., room temperature, 25° C. temperature, within 50° C. of 0° C., atmospheric pressure, 101,325 pascals pressure, 50% relative humidity, open air). Manufacturing methods include forming the materials at such conditions.

Figure 3:
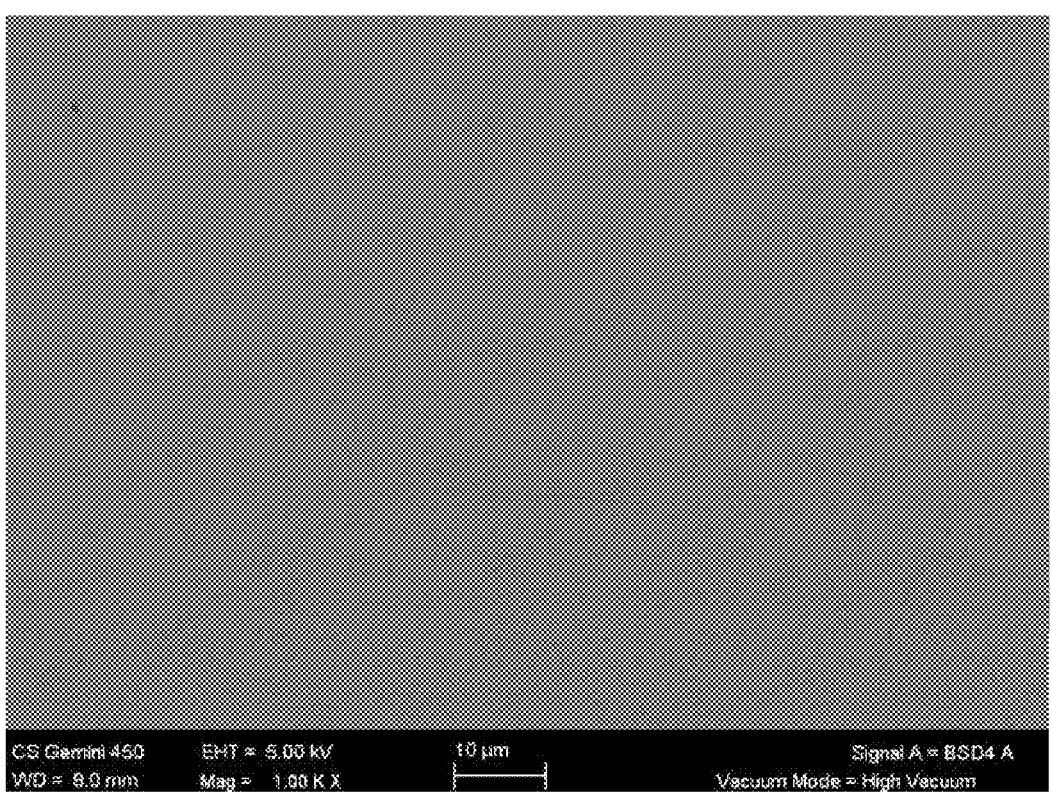
FIG. 3 is a scanning electron microscope image of a material surface according to exemplary embodiments.

FIGS. 2 and 3 show microstructure of BHB, a glass-ceramic material, and BHE, a single-phase glass, respectively. The lack of phase separation in BHE in concert with the full kill result is notable because conventional glass-ceramic materials with antimicrobial properties are typically or exclusively phase-separated and contain $Cu^{1+}$ as cuprite crystals, and are glass-ceramics, as opposed to amorphous glass and/or single-phase amorphous glass.

Figure 4:
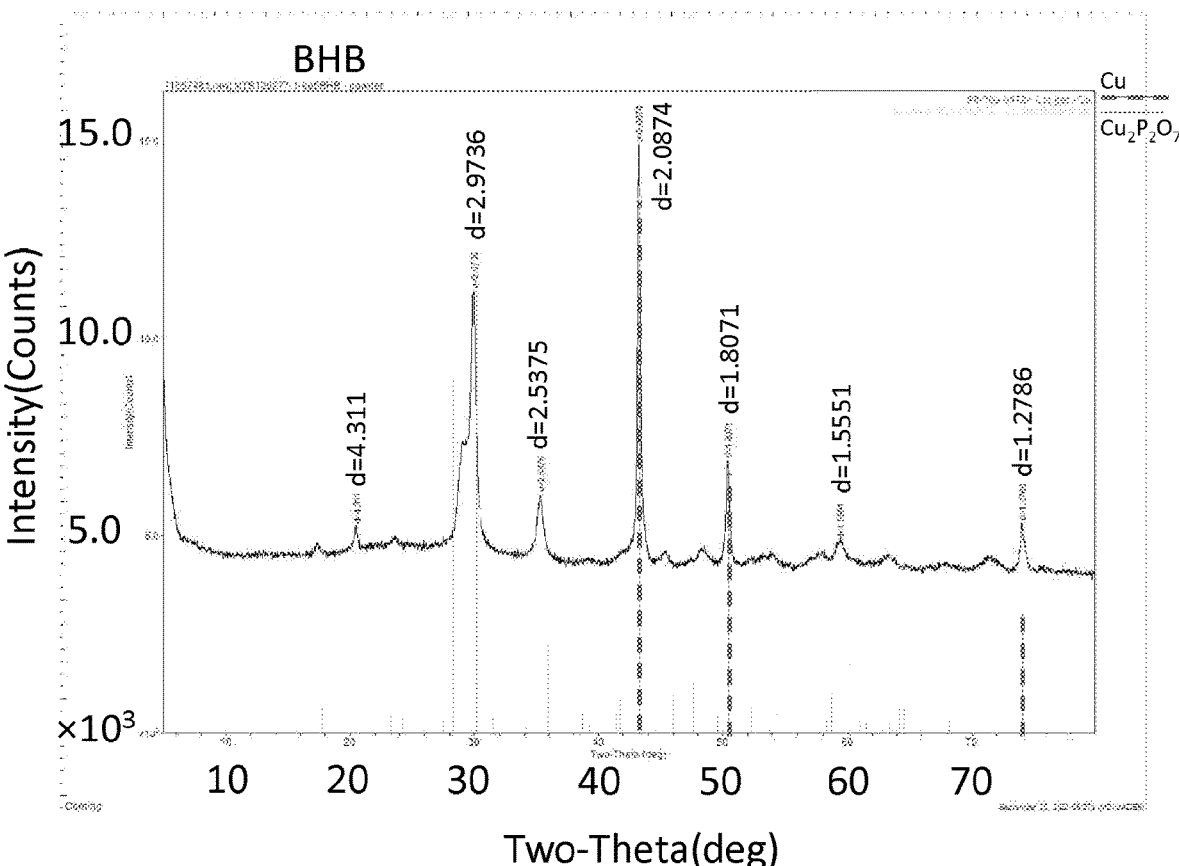
FIG. 4 is an x-ray diffraction diagram of the material of FIG. 2.
Figure 5:
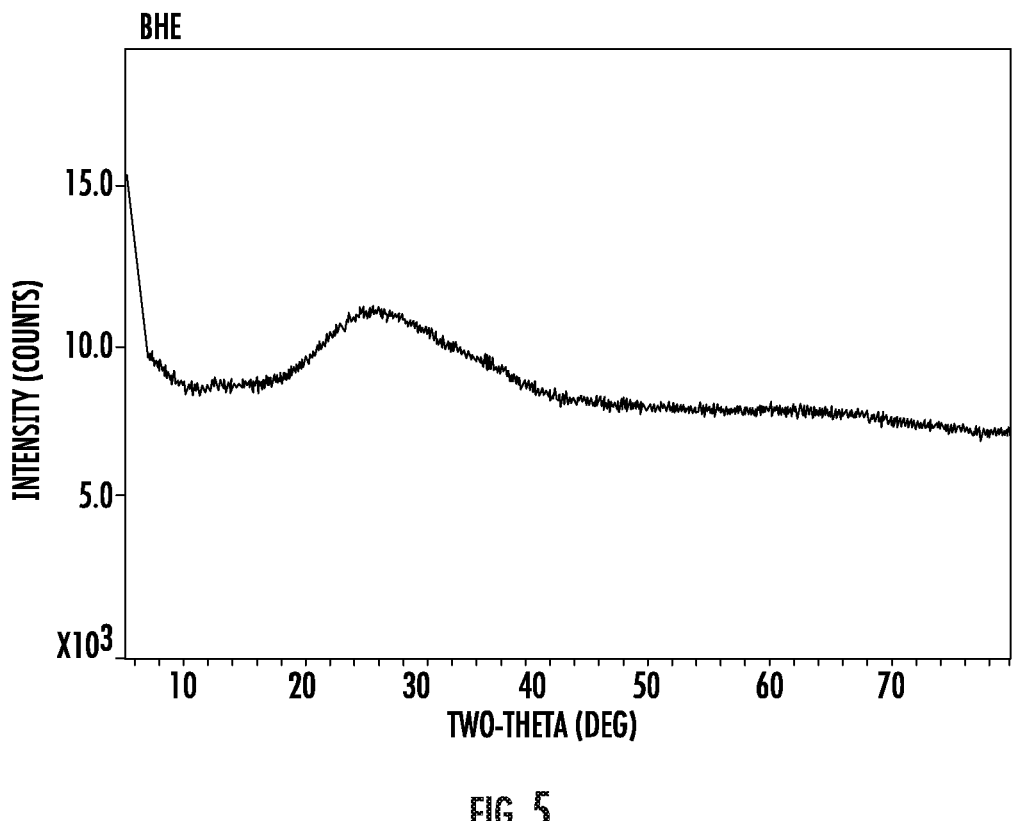
FIG. 5 is an x-ray diffraction diagram of the material of FIG. 3.
Figure 6:
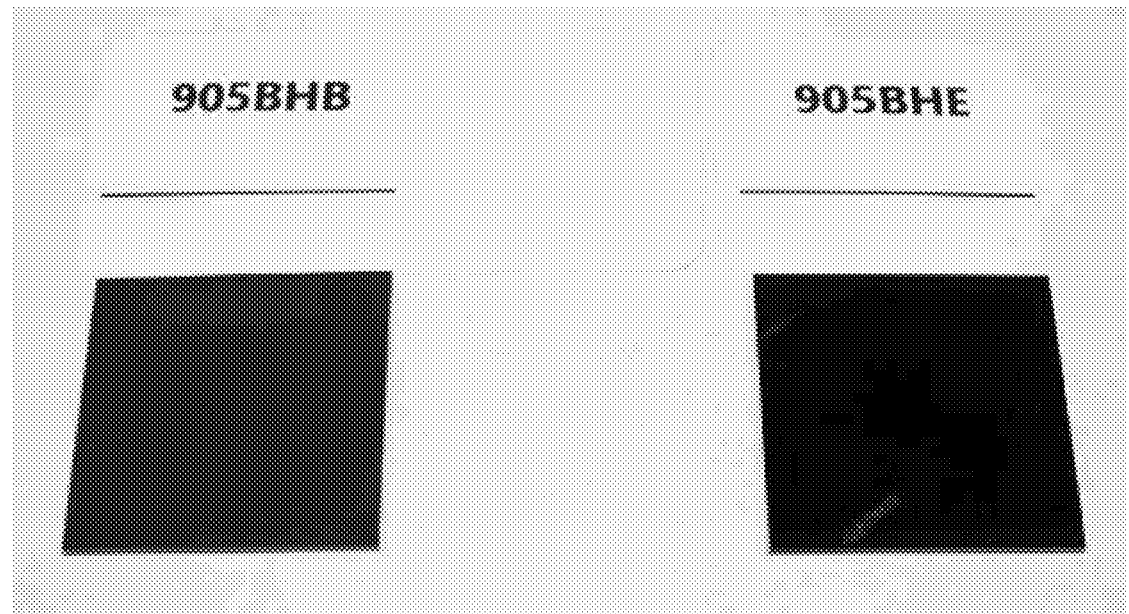
FIG. 6 is a digital image of the material of FIG. 2 on the left and the material of FIG. 3 on the right.

Referring to FIGS. 1-2 and 4 compositions disclosed herein include phosphate glass-ceramics and phase-separated phosphate glasses. Referring specifically to the sample BHB shown in FIG. 2, scanning electron microscopy shows distinct phase separation, with a glassy phase, copper metal, and crystalline phases. X-ray diffraction shows the compositions for the different phases differ from one another. For example, the copper metal of spectrum 28 is far different from the glassy phase of spectrums 29 and 30, as well as the spectrum 31 phase. Notably the glassy phase is a phosphate glass, as disclosed herein, but still includes silica, possibly due to contamination from crucible melting. FIGS. 4-5 are x-ray diffraction measurements from a powdered 1-inch by 1-inch polished coupon of BHB (FIG. 6 left) and BHE (FIG. 6 right), and represent interior of the respective patty. Accordingly, FIG. 4 shows BHB contains copper metal and crystalline copper phosphate phase (potentially with iron), while FIG. 5 shows BHE is amorphous.

Referring to FIGS. 3 and 5, surprisingly Applicants discovered that subtle differences in constituents of the ternary of FIG. 1 compared to those of BHB led to fully amorphous glass disclosed herein, such as example BHE. FIG. 5 shows BHE to be amorphous. Compare the scanning electron microscope and x-ray diffraction of FIGS. 2 and 4 versus FIGS. 3 and 5. The later results are indicative of single-phase, fully amorphous glass. Applicants believe fully amorphous glass in this system and/or with the antimicrobial properties shown is particularly unique and surprising because conventional antimicrobial glass-ceramics rely on cuprite crystals to inhibit microbes and a fully amorphous glass, especially of single phase, may not be expected to function to inhibit microbes as disclosed herein. Without being bound to any theory, one possible explanation for antimicrobial efficacy of single-phase, fully amorphous glasses disclosed herein could be formation of a thin surface layer of copper oxide that kills or inhibits microbes. Such a layer may be particularly thin, such as less than 10 μm in embodiments, and may form by exposure of the glass to open atmosphere or may be facilitated, such as by heating in oxygen.

The melt and coupon (FIG. 6 left 1-inch by 1-inch square coupon) of sample BHB show phase separation (see FIG. 2). Phases of copper metal, crystalline phases of iron, copper phosphate and glass were observed. The surface of BHB melt has a thin copper oxide layer. The melt and coupon (FIG. 6 right 1-inch by 1-inch square coupon) of sample BHE did not show any phases or apparent phase separation under any of the analysis conditions (polished, fractured or ion milled) (see FIG. 3). The surface of BHE melt has a thin copper oxide layer.

The following Table 1 includes compositions measured using the United States EPA Test Method for Efficacy of Copper Alloy Surfaces as a Sanitizer test disclosed above, compositions were measured with inductively coupled plasma mass spectroscopy. "StDev" refers to standard deviation. Additional compositions were melted and yet not tested.

| | BFS | BFW | BGF | BGG | BGW | BGZ |
|---|---|---|---|---|---|---|
| Batched (mol %) | | | | | | |
| CuO | 15 | 15 | 25 | 25 | 40 | 45 |
| $Fe_2O_3$ | 25.5 | 34 | 15 | 10 | 10 | 10 |
| $P_2O_5$ | 59.5 | 51 | 60 | 65 | 50 | 45 |
| Analyzed (mol %) | | | | | | |
| CuO | 16.8 | 16.4 | 28.6 | 29.1 | 38.8 | 41.3 |
| $Fe_2O_3$ | 24.7 | 31.7 | 14.4 | 9.8 | 7.9 | 8.2 |
| $P_2O_5$ | 58.5 | 52.0 | 57.0 | 61.2 | 45.7 | 39.9 |
| $SiO_2$ | 7.5 | 10.6 | | | | |
| Analyzed (mol %)-silica normalized out | | | | | | |
| CuO | 16.8 | 16.4 | 28.6 | 29.1 | 42.0 | 46.2 |
| $Fe_2O_3$ | 24.7 | 31.7 | 14.4 | 9.8 | 8.6 | 9.2 |
| $P_2O_5$ | 58.5 | 52.0 | 57.0 | 61.2 | 49.4 | 44.6 |
| Sum | 100.0 | 100.0 | 100.0 | 100.0 | 100.0 | 100.0 |
| Log Kill | 0.05 | −0.09 | 0.44 | 0.84 | 1.37 | 0.42 |
| StDev | 0.12 | −0.15 | 0.02 | 0.12 | 0.04 | 0.08 |
| % Kill | 9 | −31 | 64 | 85 | 96 | 62 |
| StDev | 25 | 12 | 2 | 4 | 0.4 | 7 |

| | BHA | BHB | BGQ | BHE | Copper metal |
|---|---|---|---|---|---|
| Batched (mol %) | | | | | |
| CuO | 50 | 55 | 40 | 50 | |
| $Fe_2O_3$ | 10 | 10 | 5 | 5 | |
| $P_2O_5$ | 40 | 35 | 55 | 45 | |
| Analyzed (mol %) | | | | | |
| CuO | 47.2 | 52.9 | 40.3 | 48.3 | |
| $Fe_2O_3$ | 8.3 | 8.5 | 4.2 | 4.1 | |
| $P_2O_5$ | 37.2 | 32.7 | 49.5 | 41.1 | |
| $SiO_2$ | 7.2 | 5.9 | 6.1 | 6.5 | |
| Analyzed (mol %)-silica normalized out | | | | | |
| CuO | 50.9 | 56.3 | 42.9 | 51.7 | |
| $Fe_2O_3$ | 9.0 | 9.0 | 4.4 | 4.3 | |
| $P_2O_5$ | 40.1 | 34.7 | 52.7 | 44.0 | |
| Sum | 100.0 | 100.0 | 100.0 | 100.0 | |
| Log Kill | 1.19 | 4.3 | 0.43 | 4.3 | 5.2 |
| StDev | 0.02 | 0.02 | | | |
| % Kill | 94 | 100 | 63 | 100 | 100 |
| StDev | 0.2 | 1 | | | |

According to exemplary embodiments, material disclosed herein has a CIELAB L* value below 35 on the scale of 0 black to 100 white, such as below 30, a CIELAB a* value within 5 of zero on a scale of ±100, such as within 3 of zero, such as within 1 of zero, and/or a CIELAB b* value within 5 of zero on a scale of ±100, such as within 3 of zero, such as within 1 of zero. In embodiments the material is black. In contemplated embodiments, the CIELAB L* value is at least 35, absolute value of a* is greater than 5, and absolute value of b* is greater than 5, and/or some or all the CIELAB values are at least 10 away from burnt orange (50 L*, 44 a*, and 61 b*). In embodiments, the material is otherwise colored. In embodiments, the material is burnt orange in color. The following Table 2 includes color coordinates for the BHB and BHE materials where L* is the index that goes from black at 0 to white at 100, a* goes from green (−) to red (+), and b* goes from blue (−) to yellow (+), with measurement conditions: D65-10, % R MAV SCI UVC Color i7.

| | | L* | a* | b* |
|---|---|---|---|---|
| BHB | Average | 37.61 | 8.47 | 6.39 |
| | Stdev | 0.11 | 0.46 | 0.37 |
| BHE | Average | 28.77 | −0.04 | −0.35 |
| | Stdev | 0.35 | 0.02 | 0.12 |

According to exemplary embodiments, materials disclosed herein may have copper and iron oxidation state distributions as described below. Determination of copper and iron oxidation state distribution: in contemplated embodiments, the samples are dissolved in the presence of a known amount of $Cr^{+6}$, in the form of $K_2Cr_2O_7$, which is in small excess of what is consumed by the reaction:

$$3Cu^{+1}+Cr^{+6}\rightarrow 3Cu^{+2}+Cr^{+3}$$

The remaining $Cr^{+6}$ is determined by titration with $Fe^{+2}$. The resulting value from the test is the total reducing power, i.e. $Fe^{+2}$ and $Cu^{+1}$. This result is compared to the total possible reducing power, R, based on the supplied estimated composition. The value of R can vary freely from 0 to 1, with zero meaning no reduced species present and 1 meaning no oxidized species present. As such the larger the value, the more reduced is the glass. According to contemplated embodiments, materials disclosed herein have an R value of over 0.5, such as for materials having sanitizer and antimicrobial properties disclosed herein, such as over 0.55, over 0.6, over 0.65. In other contemplated embodiments, the R value is 0.55 or less, such as 0.45 to 0.55, or over 0.65, such as at least 0.7, at least 0.8, at least 0.9.

As indicated above, in embodiments, the $P_2O_5$—$Fe_2O_3$—CuO materials may have other constituents, such as contaminants or additives to facilitate manufacturing. Some materials include at least some silica, such as examples BGW and BGZ in Table 1 above, which include 7.5 mol % and 10.6 mol % $SiO_2$ respectively when analyzed, possibly due to contamination from melting at high temperatures (e.g., 1350° C. for 5 hours) in quartz crucible. Other examples in Table 1 included $SiO_2$ as a constituent. Accordingly, Applicants discovered that $SiO_2$ may be added to the $P_2O_5$—$Fe_2O_3$—CuO materials, where resulting glasses and/or glass-ceramics still provide antimicrobial properties, as evidenced by Table 1 above. While such materials may be described as "mostly ternary" as disclosed above, as $SiO_2$ is purposely added and in greater amounts, resulting materials may also be described as part of a $P_2O_5$—$Fe_2O_3$—CuO—$SiO_2$ system.

Embodiments in the $P_2O_5$—$Fe_2O_3$—CuO—$SiO_2$ system are all black, and fall within ranges of CIELAB parameters disclosed above. Embodiments in the $P_2O_5$—$Fe_2O_3$—CuO—$SiO_2$ system may be processed (e.g., batched, melted, mixed, fined, drawn, annealed, etc.) to single-phase glasses and glass articles (e.g., push plates, frit), such as where the glasses are fully amorphous, such as through a bulk of the glass while possibly excluding a thin surface film as disclosed above. Embodiments in the $P_2O_5$—$Fe_2O_3$—CuO—$SiO_2$ system exhibit full kill by the U.S. EPA dry test. Surprisingly, glasses in the $P_2O_5$—$Fe_2O_3$—CuO—$SiO_2$ system, as disclosed herein, may be formed under normal atmospheric conditions, reducing complexity of manufacturing and environmental controls. Further, such glasses may be machined under normal conditions with regularly used solutions (e.g., diamond saw, laser cutting, controlled fracture after scribing, etc.).

According to exemplary embodiments, glasses in the $P_2O_5$—$Fe_2O_3$—CuO—$SiO_2$ system disclosed herein may still be characterized as "phosphate glasses," where in such embodiments the mol % of $P_2O_5$ is equal to or greater than $SiO_2$ and/or such that $P_2O_5$ is a primary or main network former of the glass. As disclosed above, composition constituents in percentage of total moles (mol %) include at least 10 mol % $P_2O_5$, such as at least 15 mol %, and preferably in embodiments at least 25 mol % such as for improved antimicrobial properties, such as at least 30 mol %, such as at least 35 mol %, and/or no more than 75 mol %, such as no more than 63 mol %, and preferably in embodiments no more than 50 mol % $P_2O_5$ such as for improved antimicrobial properties.

However, as evidenced by examples BGW and BGZ in Table 1 above, Applicants have discovered that in embodiments, an amount of $P_2O_5$ can be offset or reduced by inclusion of some $SiO_2$ as a constituent. Applicants have found $SiO_2$ content can be used to control dissolution behavior of glass. For example, $P_2O_5$—$Fe_2O_3$—CuO—$SiO_2$ system glasses with higher $SiO_2$ contents may exhibit lower chemical durability, which could be an advantage for applications such as paint additives where faster dissolution may be beneficial. As $SiO_2$ may be more readily available, substitution of $SiO_2$ for $P_2O_5$ may have efficiency and cost advantages. Furthermore, as evidenced by examples BGW and BGZ, Applicants find $SiO_2$ in the glass expands options of equipment that can be used to process (e.g., melt and deliver) the glasses to include quartz and quartz-lined equipment.

As a constituent in glasses and glass-ceramics as disclosed herein, $SiO_2$ may be non-zero, such as a positive amount of $SiO_2$, such as at least 1 mol %, such as at least 5 mol % as shown in Examples of Table 1, such as at least 10 mol % as shown by example BGZ of Table 1, such as at least 15 mol % as shown by examples Ex2.2, Ex2.3, Ex2.4, and Ex2.5 in Table 2, such as at least 20 mol % as shown by examples Ex2.3, Ex2.4, and Ex2.5 in Table 2, such as at least 25 mol % as shown by examples Ex2.4, and Ex2.5 in Table 2, such as at least 30 mol % as shown by example Ex2.5 in Table 2, and/or the amount of constituent $SiO_2$ may be less than 50 mol %, such as less than 40 mol %, such as less than 35 mol %, such as less than 33 mol %. Applicants found that compositions with $SiO_2$ contents greater than about 30 mol % may not melt well and or be easily poured into glasses, however in contemplated embodiments, glasses may have greater than 50 mol % $SiO_2$.

The following Table 2 includes sample phosphate glass compositions with $SiO_2$ contents, according to exemplary embodiments, which have been measured for antimicrobial efficacy. The examples in the table may be described as mostly ternary, as defined above, or may be characterized as compositions in the $P_2O_5$—$Fe_2O_3$—CuO—$SiO_2$ quaternary space. Notably, the examples of Table 2 exhibit full kill.

TABLE 2

| Analyzed (mol %) | Ex2.1 | Ex2.2 | Ex2.3 | Ex2.4 | Ex2.5 |
|---|---|---|---|---|---|
| $P_2O_5$ | 40.8 | 36.7 | 34.0 | 31.9 | 30.9 |
| $Fe_2O_3$ | 4.0 | 3.5 | 3.3 | 3.1 | 3.0 |
| CuO | 46.1 | 41.6 | 38.5 | 36.1 | 35.2 |
| $SiO_2$ | 9.1 | 18.3 | 24.2 | 29.0 | 30.9 |
| Log Kill | 4.332 | 4.332 | 4.332 | 4.332 | 4.332 |
| StDev | 0 | 0 | 0 | 0 | 0 |
| % Kill | 100.0 | 100.0 | 100.0 | 100.0 | 100.0 |
| StDev | 0.0 | 0.0 | 0.0 | 0.0 | 0.0 |

Compositions of Table 2 were measured using inductively coupled plasma mass spectrometry are "as-analyzed" amounts are provided in mol %. Note that each of the above examples in Table 2 have a log kill performance of at least 3, such as greater than 3. Log kill and % kill of Table 2 correspond to the EPA characterization disclosed above.

Figure 7A:
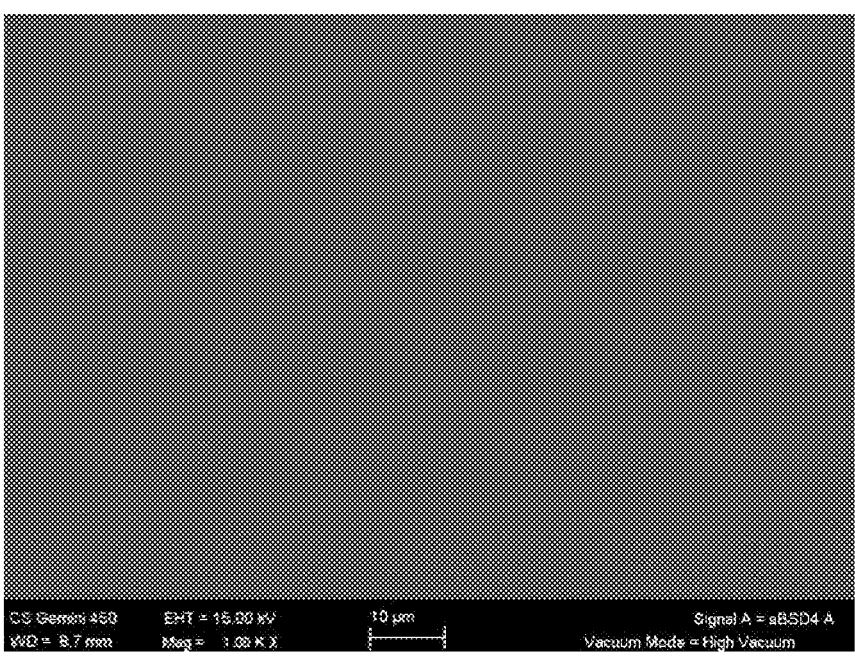
FIG. 7A is a scanning electron microscope image of a material surface according to exemplary embodiments.
Figure 7B:
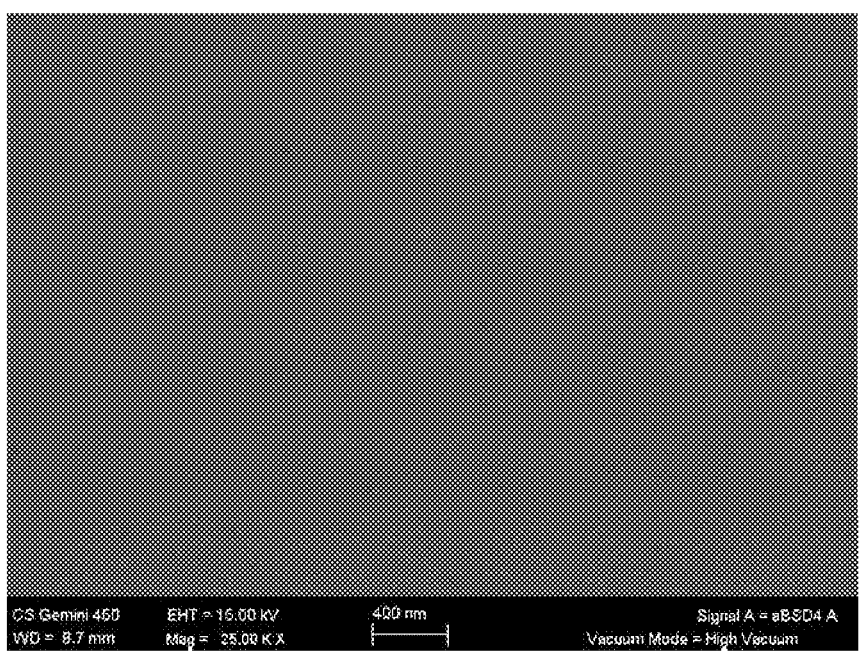
FIG. 7B is a scanning electron microscope image of the material surface of FIG. 7A, but at higher magnification.
Figure 7C:
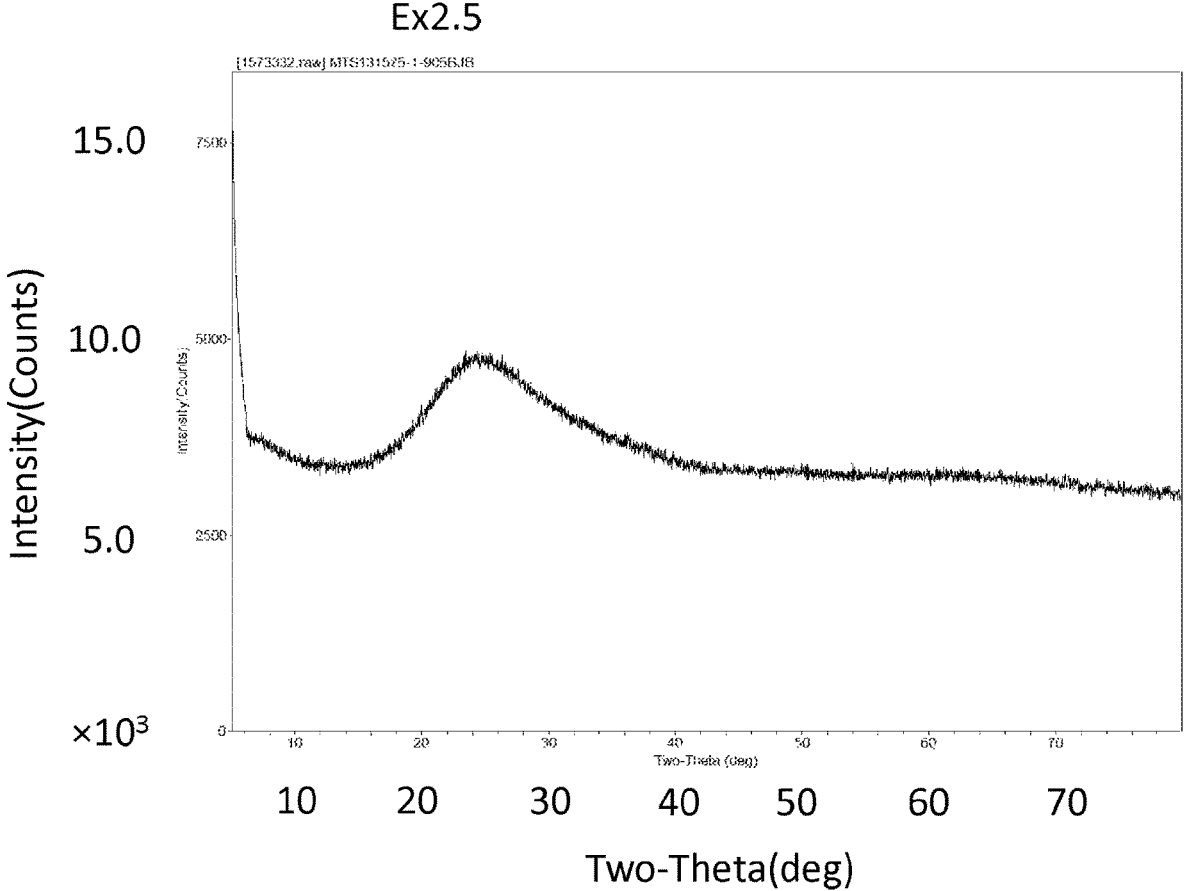
FIG. 7C is an x-ray diffraction diagram of the material of FIGS. 7A and 7B.

Referring to FIGS. 7A, 7B, and 7C, scanning electron microscope images (FIGS. 7A and 7B) and x-ray diffraction (FIG. 7C) correspond to glass of Ex2.5 from Table 2. Notably, the glass of Ex2.5 has the highest concentration of $SiO_2$ from the examples of Table 2, essentially equal parts $SiO_2$ and $P_2O_5$, where either or both constituents were less than the molar percentage of CuO as analyzed. While FIGS. 7A and 7B are SEM micrographs, the images appear generally featureless, similar to the micrograph of FIG. 3. Also, the micrograph of FIG. 7B is about 25 times the magnification of the micrographs of FIGS. 7A and 3, and FIG. 7B still shows no phase separation of the glass, precipitates, metal or crystals (compare to FIG. 2). Accordingly, materials disclosed herein may be processed to be fully amorphous, at least through their bulk as discussed above, and may be characterized as single-phase glass that is not phase-separated. This structure may be surprising or counterintuitive given the antimicrobial performance of the materials, which may have been previously expected to have been related to presence of copper-containing crystals or metal precipitates in a material. Similar to the x-ray diffraction of FIG. 5, x-ray diffraction of FIG. 7C shows that the glass of Ex2.5 is single phase, amorphous.

In furtherance of the disclosure above and as evidenced by examples disclosed, material (e.g., glass, glass-ceramic) may include, in terms of as-analyzed and/or as-batched, constituent components: a non-zero amount of $P_2O_5$ or other oxide or compound containing phosphorus, such as at least 5 mol %, at least 10 mol %, at least 20 mol %, at least 30 mol %, at least 35 mol %, at least 40 mol %, at least 50% and/or no more than 80 mol %, such as no more than 70 mol %, no more than 65 mol %, no more than 60 mol %, no more than 55 mol %, no more than 50 mol %, no more than 40 mol %, no more than 30 mol %, no more than 20 mol %, or no more than 10 mol % in contemplated embodiments; and a non-zero amount of CuO or other oxide or compound containing copper, such as at least 15 mol %, at least 20 mol %, at least 25 mol %, at least 30 mol %, at least 35 mol %, at least 40 mol %, at least 50% and/or no more than 65 mol %, such as no more than 60 mol %, no more than 55 mol %, no more than 50 mol %, no more than 45 mol %, no more than 40 mol % in contemplated embodiments.

In terms of as-analyzed and/or as-batched constituent components of the material, the sum of CuO and $P_2O_5$ may be at least 50 mol % of the composition, such as at least 60 mol %, such as at least 70 mol %, and/or less than 95 mol %, such as less than 90 mol %, such as less than 80 mol % in embodiments. Further, amounts of CuO and $P_2O_5$ may be comparable to one another, such as where a difference (in absolute value) of constituent contribution therebetween in as-analyzed and/or as-batched quantities may be less than 30 mol %, such as less than 25 mol %, such as less than 20 mol %, such as less than 15 mol %, such as less than 10 mol %.

As disclosed above and as evidenced by examples disclosed, the material (e.g., glass, glass-ceramic) may further include additional constituents, either as-batched or as-analyzed, such as at least one additional constituent (e.g., an oxide of iron, such as $Fe_2O_3$, an oxide of silicon, such as $SiO_2$) having a non-zero mol %, such as at least 0.01 mol %, at least 0.1 mol %, at least 1 mol %, at least 3 mol %, at least 5 mol %, at least 10 mol %, at least 20 mol %, at least 30 mol %, at least 35 mol %, at least 40 mol %, at least 50% and/or no more than 80 mol %, such as no more than 70 mol %, no more than 65 mol %, no more than 60 mol %, no more than 55 mol %, no more than 50 mol %, no more than 40 mol %, no more than 30 mol %, no more than 20 mol %, no more than 10 mol % in contemplated embodiments for the at least one additional constituent.

Furthermore, the material may include at least two additional constituents beyond $P_2O_5$ and CuO, such as $SiO_2$ and $Fe_2O_3$, where either or any the at least two additional constituents have a non-zero mol %, such as at least 0.01 mol %, at least 0.1 mol %, at least 1 mol %, at least 3 mol %, at least 5 mol %, at least 10 mol %, at least 20% or more and/or no more than 80 mol %, such as no more than 70 mol %, no more than 65 mol %, no more than 60 mol %, no more than 50 mol %, no more than 35 mol %, no more than 30 mol %, no more than 25 mol %, no more than 20 mol %, no more than 15 mol %, no more than 10 mol %, no more than 8 mol % in contemplated embodiments, or any combination of such ranges for the additional constituents such as 1 mol %≤$Fe_2O_3$≤15 mol % and 0<$SiO_2$≤35 mol %, for example.

The constituents of $P_2O_5$, CuO, $Fe_2O_3$, and $SiO_2$ in sum with one another may make up a majority of the material, in terms of as-batched or as-analyzed mol %, such as where ($P_2O_5$+CuO+$Fe_2O_3$+$SiO_2$) is at least 60 mol %, at least 70 mol %, at least 80 mol %, at least 90 mol %, and/or but clearly not more than 100 mol %, such as not more than 99 mol % in contemplated embodiments, such as not more than 95 mol %, not more than 90 mol %, or not more than 80 mol %, such as where additional constituents may be added to the composition. The amount of $SiO_2$ may be more than $Fe_2O_3$; and/or constituents of $P_2O_5$, CuO, and $SiO_2$ in sum with one another may make up a majority of the material, in terms of as-batched or as-analyzed mol %, such as where ($P_2O_5$+CuO+$SiO_2$) is at least 65 mol %, at least 75 mol %, at least 80 mol %, at least 90 mol %, and/or but clearly not more than 100 mol %, such as not more than 99 mol % in embodiments, such as not more than 95 mol %, not more than 90 mol %, or not more than 80 mol %.

As disclosed above and as evidenced by examples disclosed, the material (e.g., glass, glass-ceramic) may characterized as a phosphate glass and accordingly may have a substantial phosphorus component. For example, as-batched or as analyzed $SiO_2$ may be less than $P_2O_5$ as a constituent, such as by at least 1 mol %, such as at least 3 mol %, at least 5 mol %, at least 10 mol %, at least 15 mol %, at least 20 mol %, at least 30 mol % and/or not, such as where $SiO_2$ and $P_2O_5$ are about the same (e.g., within 1 mol %). In contemplated embodiments, $SiO_2$ is greater than $P_2O_5$ as a constituent component of the material composition, such as by at least 1 mol %, such as at least 3 mol %, at least 5 mol %, at least 10 mol %, at least 15 mol %, at least 20 mol %, at least 30 mol %. Similarly, as-batched or as analyzed $SiO_2$ may be less than CuO as a constituent, such as by at least 1 mol %, such as at least 3 mol %, at least 5 mol %, at least 10 mol %, at least 15 mol %, at least 20 mol %, at least 30 mol % and/or not, such as where $SiO_2$ and CuO are about the same (e.g., within 1 mol %), or where $SiO_2$ is greater than CuO in contemplated embodiments, such as by at least 1 mol %, such as at least 3 mol %, at least 5 mol %, at least 10 mol %, at least 15 mol %, at least 20 mol %, at least 30 mol %. As indicated, Applicants find use of some $SiO_2$ to have benefits, but too much $SiO_2$ in phosphate glasses and glass-ceramics as disclosed herein can be difficult to process.

In furtherance of disclosure above and as evidenced by examples disclosed, material (e.g., glass, glass-ceramic) may include, in terms of as-analyzed and/or as-batched, constituent components $P_2O_5$ or other oxide or compound containing phosphorus in amounts as disclosed above and CuO or other oxide or compound containing copper in amounts as disclosed above. The sum of CuO and $P_2O_5$ (i.e. CuO+$P_2O_5$ in mol %) may be substantial in the material, such as at least 50 mol % of the composition or other amounts as disclosed above.

Further, the material may include additional constituents, either as-batched or as-analyzed, such as at least one additional constituent (e.g., an oxide of iron, such as $Fe_2O_3$, an

14 as disclosed above, the material may include at least two additional constituents beyond $P_2O_5$ and CuO, such as $SiO_2$ and $Fe_2O_3$, such as in amounts disclosed above.

The following Table 3 includes additional example of materials (e.g., glass, glass-ceramics) according to exemplary embodiments.

TABLE 3

| Analyzed (mol %) | Ex. A | Ex. B | Ex. C | Ex. D | Ex. E | Ex. F | Ex. G |
|---|---|---|---|---|---|---|---|
| $P_2O_5$ | 40.4 | 41 | 39.8 | 39.4 | 38.1 | 40.1 | 41.4 |
| $Fe_2O_3$ | | | | | | | |
| CuO | 47.7 | 48.8 | 47.9 | 48.2 | 47.3 | 46.3 | 47.8 |
| $SiO_2$ | 7.1 | 5.4 | 7 | 7.8 | 9.9 | 8.8 | 6.1 |
| MgO | 4.8 | | | | | | |
| ZnO | | 4.8 | | | | | |
| CaO | | | 5.4 | | | | |
| SrO | | | | 4.7 | | | |
| BaO | | | | | 4.7 | | |
| $Li_2O$ | | | | | | 4.8 | |
| $Na_2O$ | | | | | | | 4.8 |
| $K_2O$ | | | | | | | |
| $TiO_2$ | | | | | | | |
| $Al_2O_3$ | | | | | | | |
| NiO | | | | | | | |
| $MnO_2$ | | | | | | | |
| Single Phase Glass | | X | X | X | | | X |
| Crystalline Cu present (phase-separated) | X | | | | X | X | |
| Log Kill | 5.06 | 5.06 | 5.06 | 5.06 | 5.06 | 5.06 | 5.06 |
| StDev | 0.00 | 0.00 | 0.00 | 0.00 | 0.00 | 0.00 | 0.00 |
| % Kill | 100.0 | 100.0 | 100.0 | 100.0 | 100.0 | 100.0 | 100.0 |
| StDev | 0.0 | 0.0 | 0.0 | 0.0 | 0.0 | 0.0 | 0.0 |

| Analyzed (mol %) | Ex. H | Ex. I | Ex. J | Ex. K | Ex. L | Ex. M | Ex. N |
|---|---|---|---|---|---|---|---|
| $P_2O_5$ | 40 | 40.4 | 48.3 | 47.1 | 44.8 | 44.2 | 43.7 |
| $Fe_2O_3$ | | | | | | | |
| CuO | 47.3 | 48.4 | 45.7 | 48.0 | 49.4 | 50.0 | 50.5 |
| $SiO_2$ | 8 | 6.4 | 6.1 | 4.9 | 0.8 | 1.0 | 1.3 |
| MgO | | | | | | | |
| ZnO | | | | | | | |
| CaO | | | | | | | |
| SrO | | | | | | | |
| BaO | | | | | | | |
| $Li_2O$ | | | | | | | |
| $Na_2O$ | | | | | | | |
| $K_2O$ | 4.8 | | | | | | |
| $TiO_2$ | | 4.8 | | | | | |
| $Al_2O_3$ | | | | | 5.1 | | |
| NiO | | | | | | 4.8 | |
| $MnO_2$ | | | | | | | 4.6 |
| Single Phase Glass | X | X | X | X | X | X | X |
| Crystalline Cu present (phase-separated) | | | | | | | |
| Log Kill | 5.06 | 1.77 | 0.97 | 1.18 | 1.57 | 5.477 | 5.477 |
| StDev | 0.00 | 0.31 | 0.03 | 0.00 | 0.29 | 0.00 | 0.00 |
| % Kill | 100.0 | 98.1 | 89.2 | 93.4 | 97.0 | 100.0 | 100.0 |
| StDev | 0.0 | 1.3 | 0.9 | 0.1 | 1.9 | 0.0 | 0.0 | oxide of silicon, such as $SiO_2$) having a non-zero mol %, such as in amounts disclosed above. As indicated above, constituents of $P_2O_5$, CuO, and $SiO_2$ in sum with one another (i.e. $P_2O_5$+CuO+$SiO_2$ in mol %) may make up a majority of the material, in terms of as-batched or as-analyzed mol % and in amounts as disclosed above. With that said, the constituent(s) may be a constituent other than $SiO_2$, as disclosed above, such as $Fe_2O_3$ and/or different modifiers and other constituents such as MgO, ZnO, CaO, SrO, BaO, $Li_2O$, $Na_2O$, $K_2O$, $TiO_2$, NiO, $MnO_2$, and $Al_2O_3$ or combinations thereof. And, in at least some such instances Compositions of Table 3 were measured using inductively coupled plasma mass spectrometry and are in "as-analyzed" amounts provided in mol % corresponding representative oxides of elemental components. Note that many of the above examples in Table 3 have a log kill performance of at least 3, such as greater than 3. "Log kill" and "% kill" of Table 3 correspond to the EPA characterization disclosed above. "X" in the category of "single phase glass" corresponds to the sample being fully amorphous and single-phase, while "X" in the "crystalline Cu present (phase-separated)" category corresponds to the example being a glass-ceramic with copper-containing crystals.

As demonstrated by examples in Table 3, among other disclosure herein, the material may comprise CuO and $P_2O_5$ in above disclosed amounts, plus an additional constituent, such as $SiO_2$, $Fe_2O_3$, MgO, ZnO, CaO, SrO, BaO, $Li_2O$, $Na_2O$, $K_2O$, $TiO_2$, NiO, $MnO_2$, and/or $Al_2O_3$, where the corresponding material may display antimicrobial behavior, such as from fairly ineffective antimicrobial behavior to full kill by the U.S. EPA dry test. Interestingly, Applicants found binary CuO and $P_2O_5$ compositions (i.e. without additional constituents) in a similar composition range may not exhibit full kill, so at least one additional constituent (e.g., modifier component) may help facilitate antimicrobial behavior of the material.

Such materials may be fully amorphous, single phase materials, such as where the additional constituent includes ZnO, CaO, SrO, $Na_2O$, and $K_2O$-containing materials, or phase-separated and partially crystalline, such as where the additional constituent includes MgO, BaO, and $Li_2O$-containing materials. As indicated above, microstructure of amorphous compositions may be advantageous for uses that include bulk parts, such as door push plates and elevator buttons for architectural applications. Single phase amorphous materials may be black, within the color ranges disclosed above, and the phase-separated materials appear mottled orange and black. Such materials could be used for applications that use antimicrobial powders or frit, such as additives for paint. Further, compositions of Table 3 are phosphate glasses, but these phosphate glasses may be formed and machined under normal atmospheric conditions (e.g., under 50° C. (exterior to the forming equipment, such as furnace), atmospheric pressure, zero humidity, open air).

Applicants have found $Fe_2O_3$ may be difficult for some melting and/or forming processes as $Fe_2O_3$ may easily alloy with metals used in manufacturing processes. Using other modifier cations can be advantageous for manufacturing. For example, some or all of $Fe_2O_3$ may be substituted with $R_2O$ as a modifier, where R is an alkali metal, such as Li, Na, and/or K. In other examples, some or all of the $Fe_2O_3$ may be substituted with R'O as a modifier, where R' is an alkaline earth metal or zinc, such as Mg, Zn, $C_a$, Sr, Ba, for example. Still, in embodiments, some or all of $Fe_2O_3$ may be substituted with Ti, Ni, Mn, and/or Al, such as in the form of respective oxides thereof, such as $TiO_2$, NiO, $MnO_2$, and/or $Al_2O_3$.

In embodiments, a material, such as an amorphous glass, may include $P_2O_5$ in amounts as disclosed above (e.g., >30 mol %), CuO in amounts as disclosed above (e.g., >30%), and a non-zero amount of alkali metal oxide, such as at least 0.1 mol % (as-analyzed or as-batched), at least 0.2 mol %, at least 0.5 mol %, at least 1 mol %, at least 2 mol %, at least 3 mol %, at least 4 mol %, at least 4.5 mol % and/or no more than 25 mol %, such as no more than 20 mol %, no more than 15 mol %, no more than 12.5 mol %, no more than 10 mol %, no more than 8 mol %, no more than 6 mol %, or no more than 5 mol %, where the alkali metal oxide may be $Li_2O$, as shown by Example F of Table 3, $Na_2O$ as shown by Example G, $K_2O$ as shown by Example H, or another alkali metal oxide or another amount thereof (e.g., none or more than 25 mol %). In contemplated embodiments, the modifier may include more than one alkali metal oxide where the sum of the alkali metal oxides is in such a range.

The alkali metal oxide, as evidenced by Examples F, G, and H of Table 3, may be combined with $SiO_2$ in embodiments, or in some contemplated embodiments may be in materials that include $P_2O_5$ and CuO, but without $SiO_2$. For example, materials as disclosed herein may include $P_2O_5$ and CuO, in amounts as disclosed above, one or more alkali metal oxide constituents, such as $Li_2O$, $Na_2O$, $K_2O$ in amounts as disclosed above, and oxides of iron (denoted $Fe_2O_3$ for convenience) in ranges as disclosed above. For embodiments with an alkali metal oxide modifier, Applicants contemplate that ion-exchange strengthening of the glass family is possible.

Figure 12C:
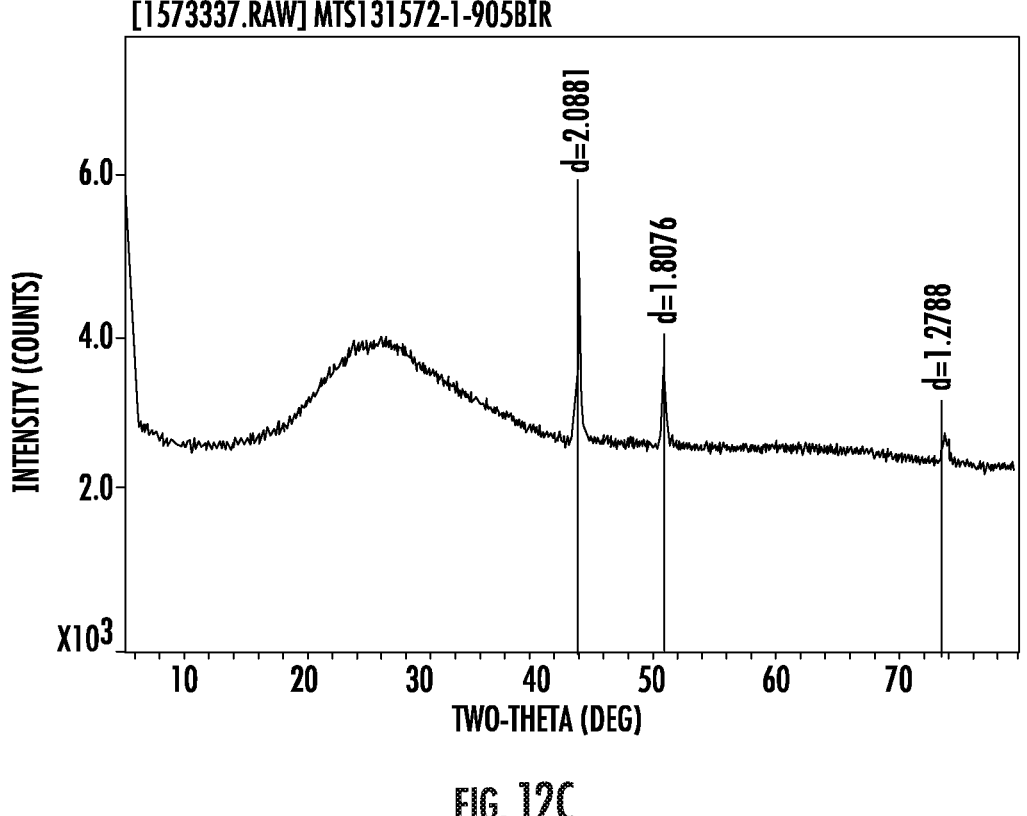
FIG. 12C is an x-ray diffraction diagram of the material of FIGS. 12A and 12B.
Figure 13A:
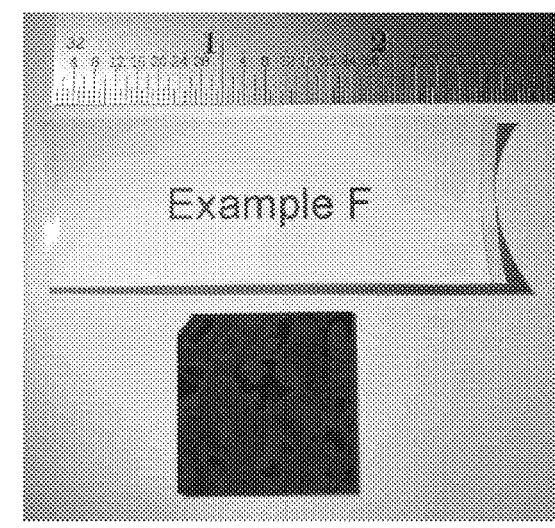
FIG. 13A is a digital image of a sample of material, corresponding to Sample F of Table 3 below, according to exemplary embodiments.
Figure 13B:
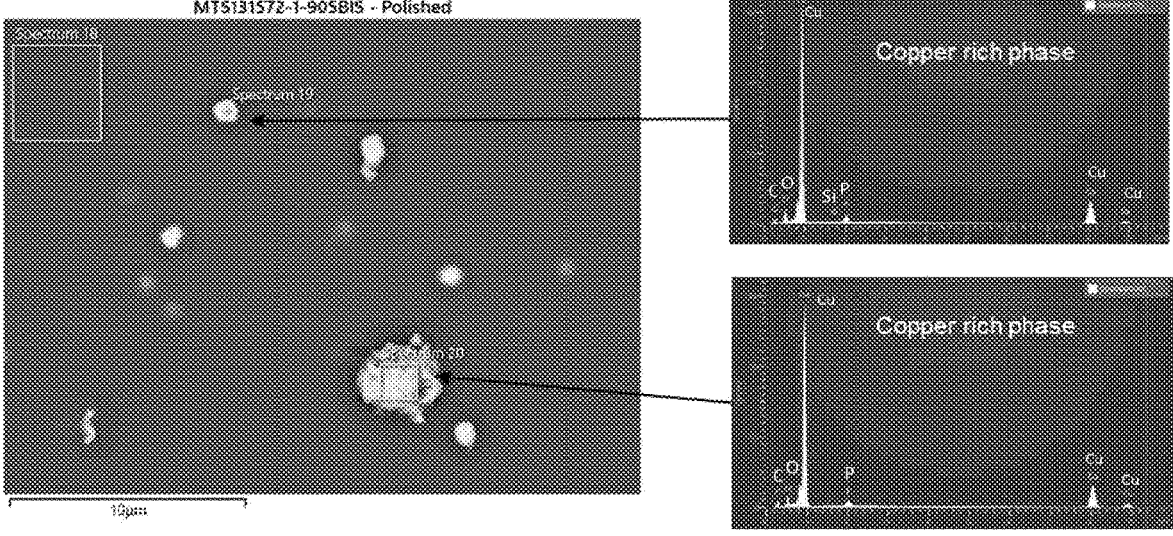
FIG. 13B is a scanning electron microscope micrograph of the sample of FIG. 13A surrounded by x-ray diffraction diagrams for locations on the image.
Figure 13C:
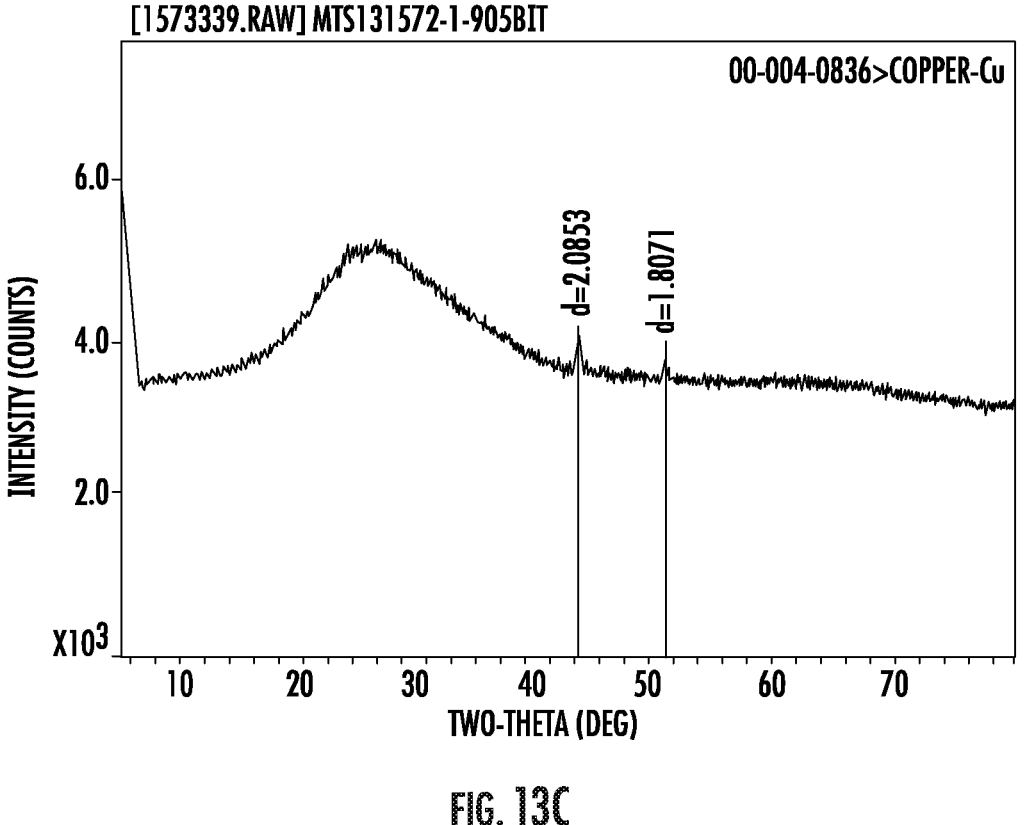
FIG. 13C is an x-ray diffraction diagram of the material of FIGS. 13A and 13B.

FIGS. 13A, 13B, and 13C, show material of Example F of Table 3, which was batched as 5 mol % $Li_2O$, 45 mol % $P_2O_5$, and 50 mol % CuO. As can be seen in the digital image of FIG. 13A, the material had a mottled coloring, such as a mix of burnt orange and black coloring. As shown in the micrograph of FIG. 13B, the material included crystals or precipitates of copper-rich phase. At least some, such as most of the crystals have a cross-sectional dimension less than 10 μm, such as less than 7 μm, and/or at least 100 nm, such as at least 0.5 μm. At least some, such as most of the crystals are located within at least 100 μm of another of the crystals, such as within 50 μm, such as within 10 μm, and/or no more than 100 nm, such as no more than 0.5 μm from the nearest other crystal. The crystals may be present throughout a bulk of such material, as opposed on only on the surface, or may be grown on the surface through surface heat treatments, or on certain regions, but not others, such as with regions with crystals removed by laser bleaching. As shown in FIG. 13C, x-ray diffraction evidences glass-ceramic, crystalline and glassy phases. The plot shows identifiable spikes (i.e. beyond noise) corresponding to crystals, such as at least one, at least two, and/or such as a spike where Two-Theta is about 2.0853 deg, a spike where Two-Theta is about 1.8071 deg, and/or a spike where Two-Theta is about 1.2788 deg (see also FIG. 12C), such as where "about" may be within 0.05 deg, such as within 0.025 deg.

Figure 14A:
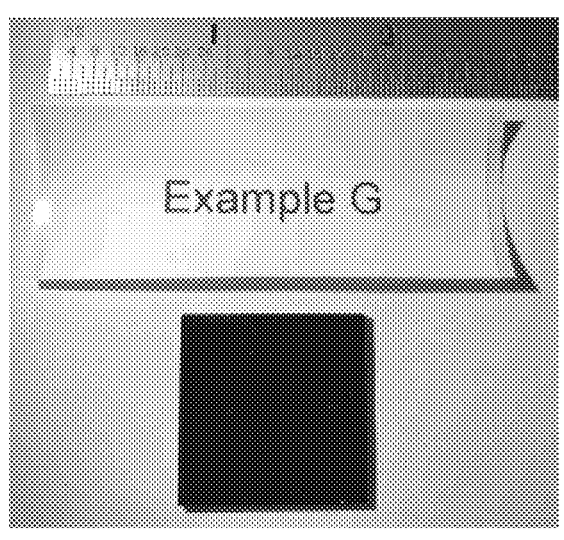
FIG. 14A is a digital image of a sample of material, corresponding to Sample G of Table 3 below, according to exemplary embodiments.
Figure 14B:
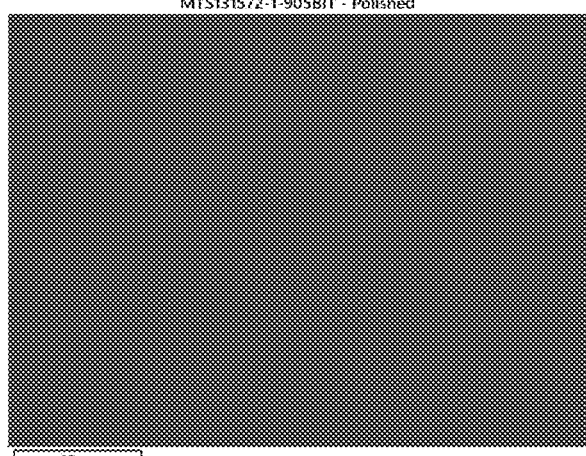
FIG. 14B is a scanning electron microscope micrograph of the sample of FIG. 14A.
Figure 14C:
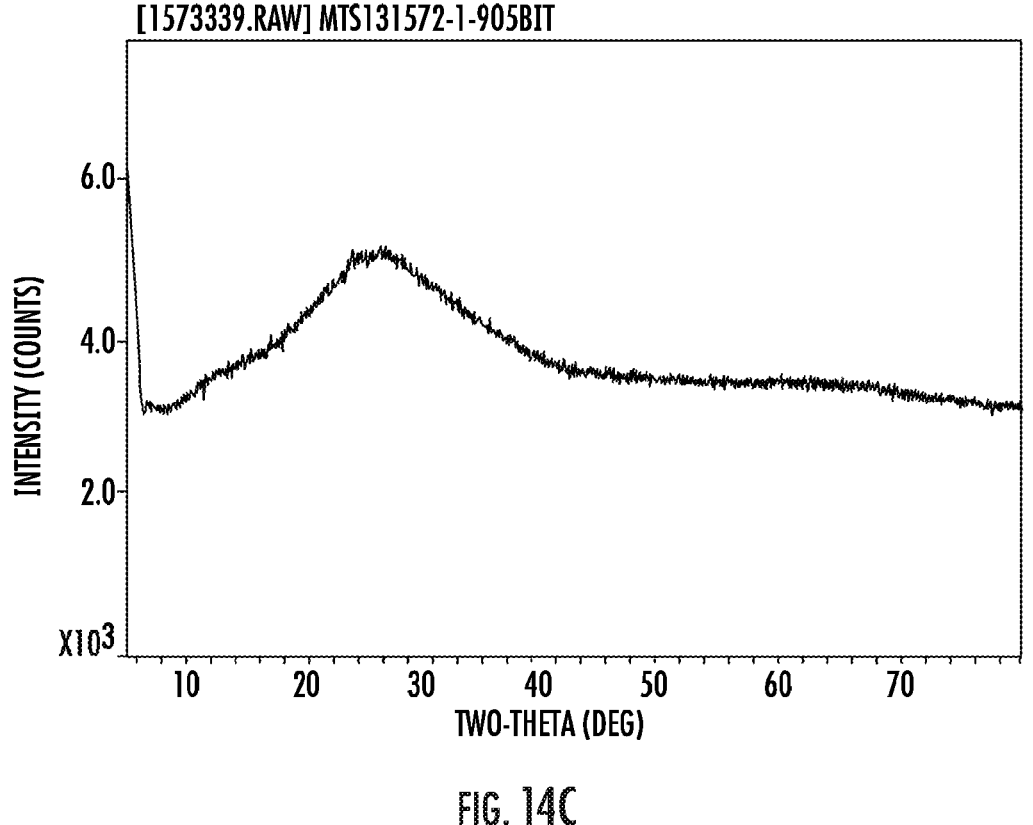
FIG. 14C is an x-ray diffraction diagram of the material of FIGS. 14A and 14B.

By contrast, FIGS. 14A, 14B, and 14C show material of Example G, which was batched as 5 mol % $Na_2O$, 45 mol % $P_2O_5$, 50 mol % CuO. The digital image of FIG. 14A shows a uniformly colored sample, such as a black sample within the CIELab color ranges disclosed above. Further, the micrograph of FIG. 14B and the x-ray diffraction information in FIG. 14C show the material of Example G can be formed as a single-phase amorphous glass.

Figure 15A:
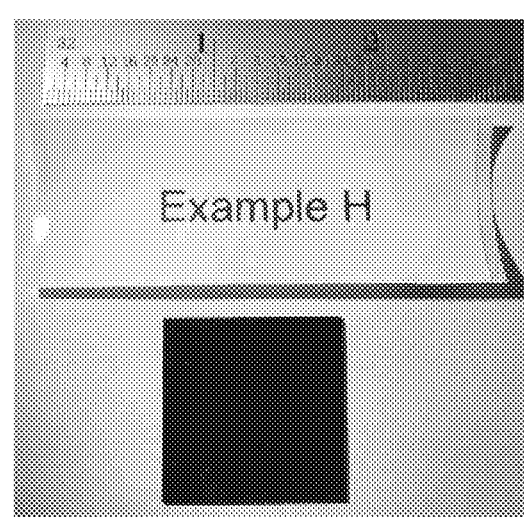
FIG. 15A is a digital image of a sample of material, corresponding to Sample H of Table 3 below, according to exemplary embodiments.
Figure 15B:
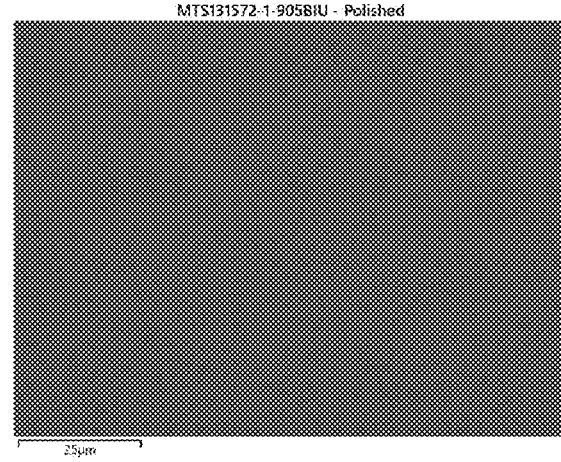
FIG. 15B is a scanning electron microscope micrograph of the sample of FIG. 15A.
Figure 15C:
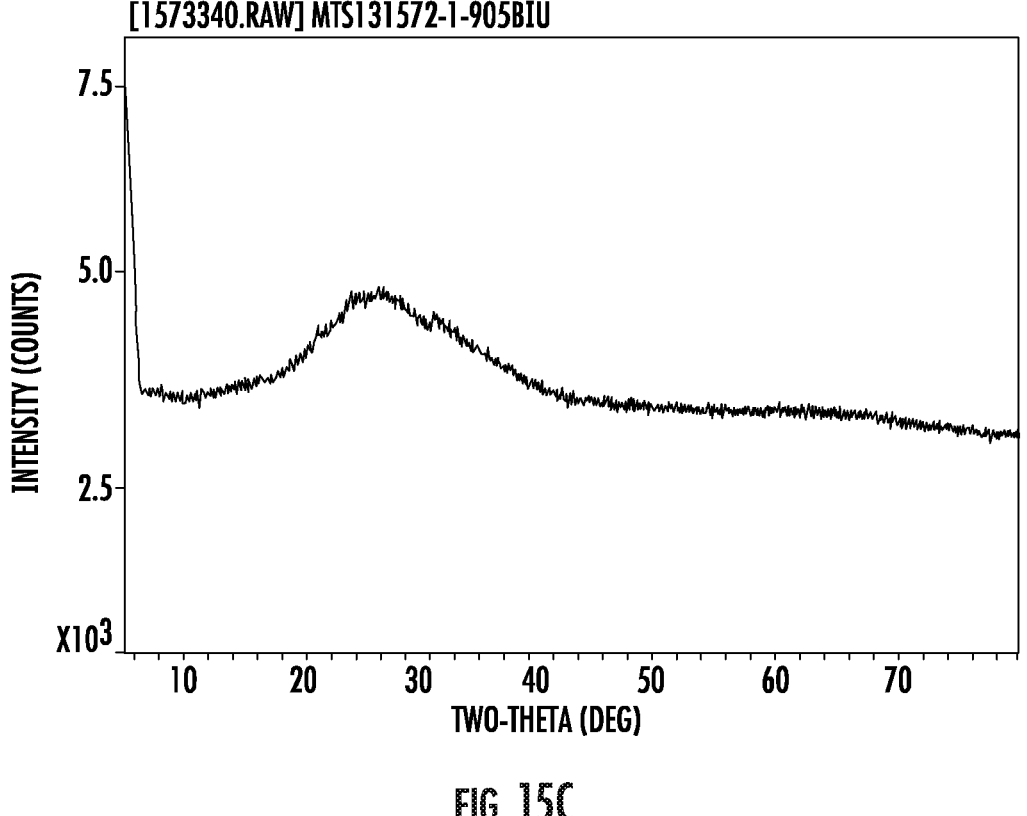
FIG. 15C is an x-ray diffraction diagram of the material of FIGS. 15A and 15B.

FIGS. 15A, 15B, and 15C show material of Example H, which was batched as 5 mol % $K_2O$, 45 mol % $P_2O_5$, 50 mol % CuO. The digital image of FIG. 15A shows a uniformly colored sample, such as a black sample within the CIELab color ranges disclosed above. Further, the micrograph of FIG. 15B and the x-ray diffraction information in FIG. 15C show the material of Example H, similar to the material of Example G, can be formed as a single-phase amorphous glass.

In embodiments, a material, such as an amorphous glass may include $P_2O_5$ in amounts as disclosed above (e.g., >30 mol %), CuO in amounts as disclosed above (e.g., >30%), and a non-zero amount of alkaline earth metal oxide and/or zinc oxide, such as at least 0.1 mol % (as-analyzed or as-batched), at least 0.2 mol %, at least 0.5 mol %, at least 1 mol %, at least 2 mol %, at least 3 mol %, at least 4 mol %, at least 4.5 mol % and/or no more than 25 mol %, such as no more than 20 mol %, no more than 15 mol %, no more than 12.5 mol %, no more than 10 mol %, no more than 8 mol %, no more than 6 mol %, or no more than 5 mol %, where the alkaline earth metal oxide may be CaO, as shown by Example C of Table 3, MgO as shown by Example A, SrO as shown by Example D, BaO as shown by Example E, ZnO as shown in Example B, or another alkaline earth metal oxide or another amount thereof (e.g., none or more than 25 mol %). In contemplated embodiments, the modifier may include more than one alkaline earth metal oxides where the sum of the alkaline earth metal oxides is in such a range.

The alkaline earth metal oxide, as evidenced by Examples A, C, D, E, and B (for zinc oxide) of Table 3, may be combined with $SiO_2$ in embodiments, or may be in materials that include MgO, ZnO, CaO, SrO, BaO, but without $SiO_2$. For example, materials as disclosed herein may include $P_2O_5$ and CuO, in amounts as disclosed above, one or more alkaline earth metal oxide constituents, such as MgO, CaO, SrO, BaO, or ZnO, in amounts as disclosed above, and $Fe_2O_3$ in ranges as disclosed above.

Figure 8A:
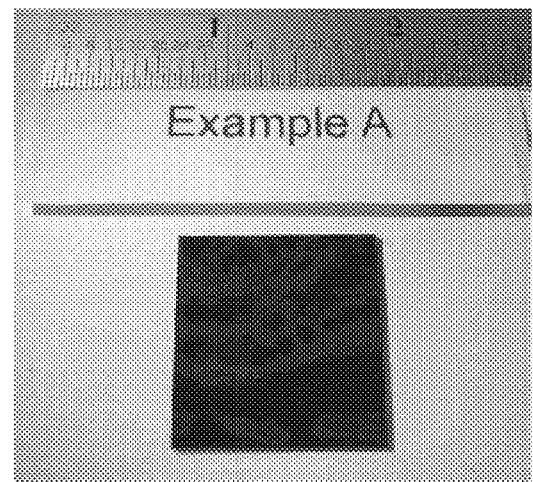
FIG. 8A is a digital image of a sample of material, corresponding to Sample A of Table 3 below, according to exemplary embodiments.
Figure 8B:
FIG. 8B is a scanning electron microscope micrograph of the sample of FIG. 8A surrounded by x-ray diffraction diagrams for locations on the image.
Figure 8B:
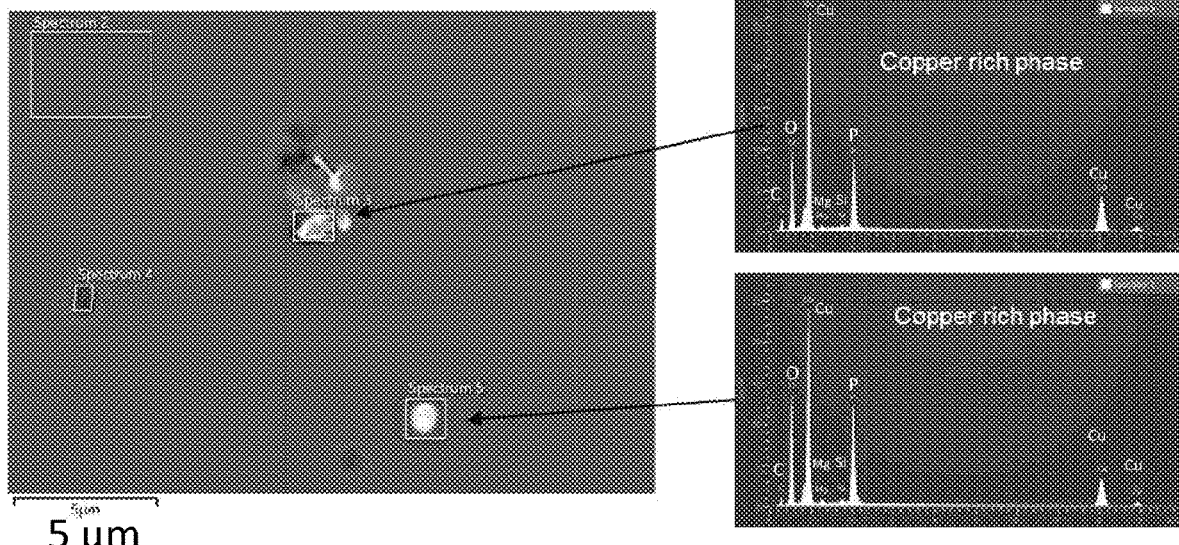
Figure 8C:
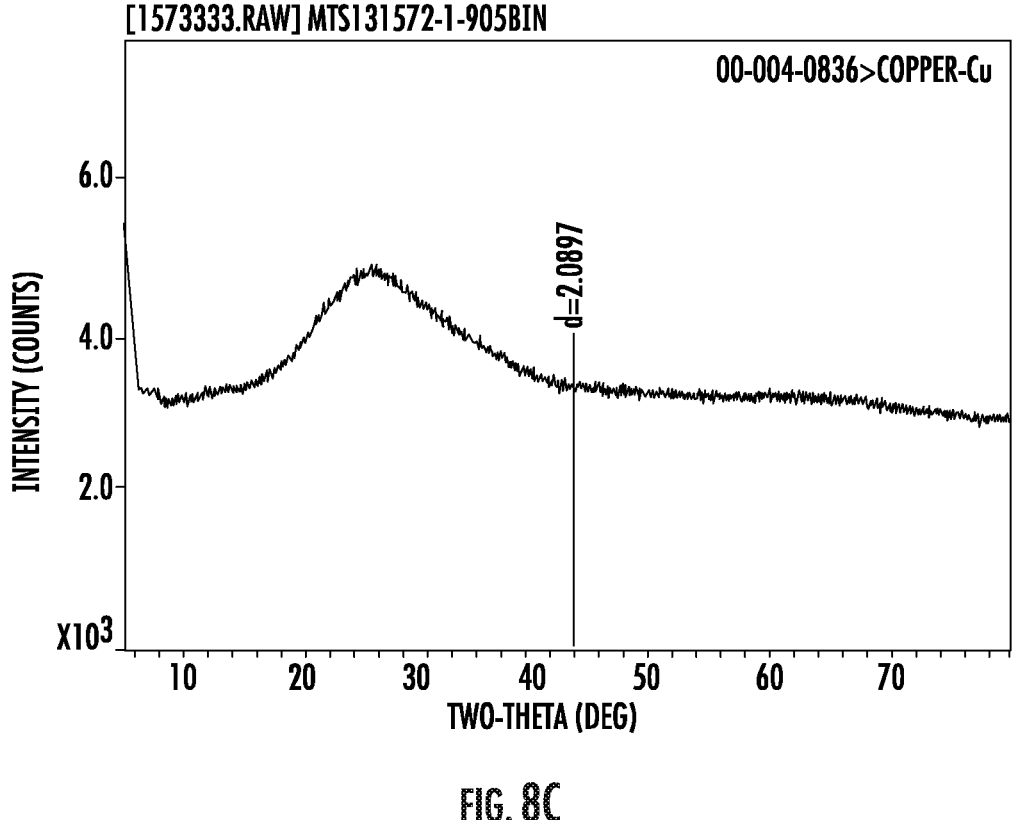
FIG. 8C is an x-ray diffraction diagram of the material of FIGS. 8A and 8B.

FIGS. 8A, 8B, and 8C, show material of Example A of Table 3, which was batched as 5 mol % MgO, 45 mol % $P_2O_5$, and 50 mol % CuO. As can be seen in the digital image of FIG. 8A, the material had a mottled coloring, such as a mix of burnt orange and black coloring. As shown in the micograph of FIG. 8B, the material included crystals or precipitates of copper-rich phase. As shown in FIG. 8C, x-ray diffraction evidences that the material of FIG. 8A is a glass-ceramic, including crystalline and glassy phases.

Figure 9A:
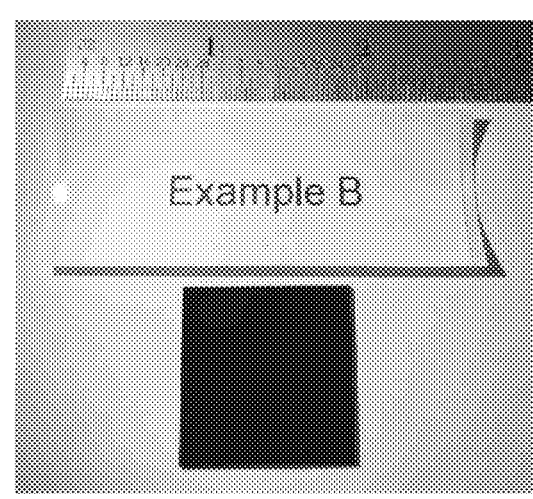
FIG. 9A is a digital image of a sample of material, corresponding to Sample B of Table 3 below, according to exemplary embodiments.
Figure 9B:
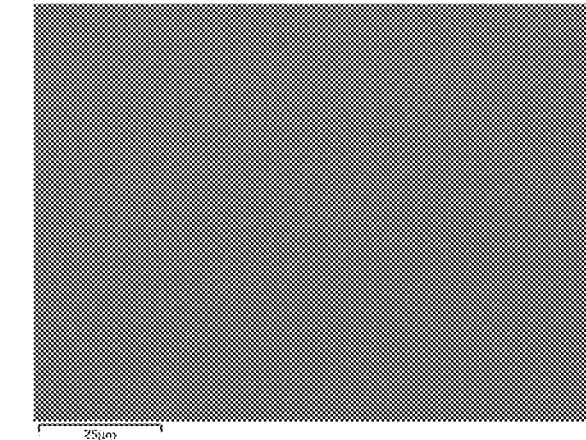
FIG. 9B is a scanning electron microscope micrograph of the sample of FIG. 9A.
Figure 9C:
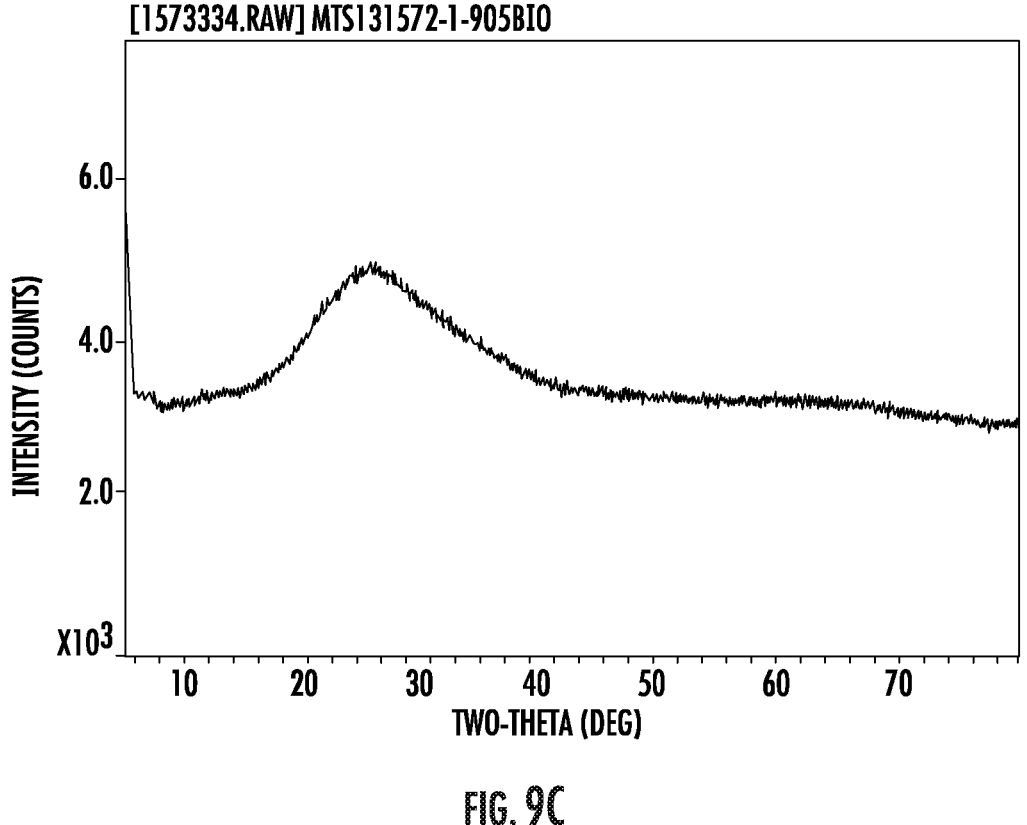
FIG. 9C is an x-ray diffraction diagram of the material of FIGS. 9A and 9B.

FIGS. 9A, 9B, and 9C show material of Example B, which was batched as 5 mol % ZnO, 45 mol % $P_2O_5$, 50 mol % CuO. The digital image of FIG. 9A shows a uniformly colored sample, such as a black sample within the CIELab color ranges disclosed above. Further, the micrograph of FIG. 9B and the x-ray diffraction information in FIG. 9C show the material of Example B can be formed as a single-phase amorphous glass.

Figures 10A, 10B:
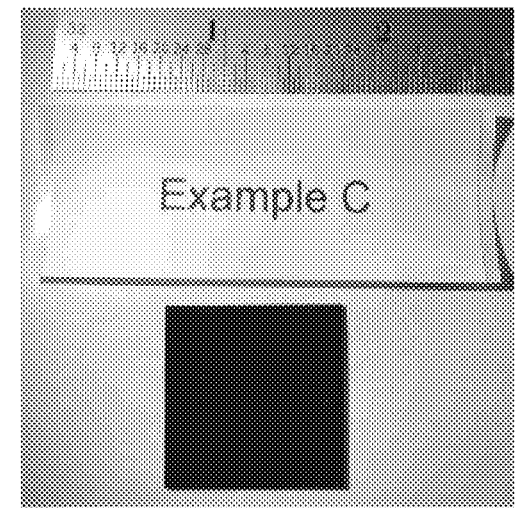
FIG. 10A is a digital image of a sample of material, corresponding to Sample C of Table 3 below, according to exemplary embodiments.
FIG. 10B is a scanning electron microscope micrograph of the sample of FIG. 10A.
Figure 10C:
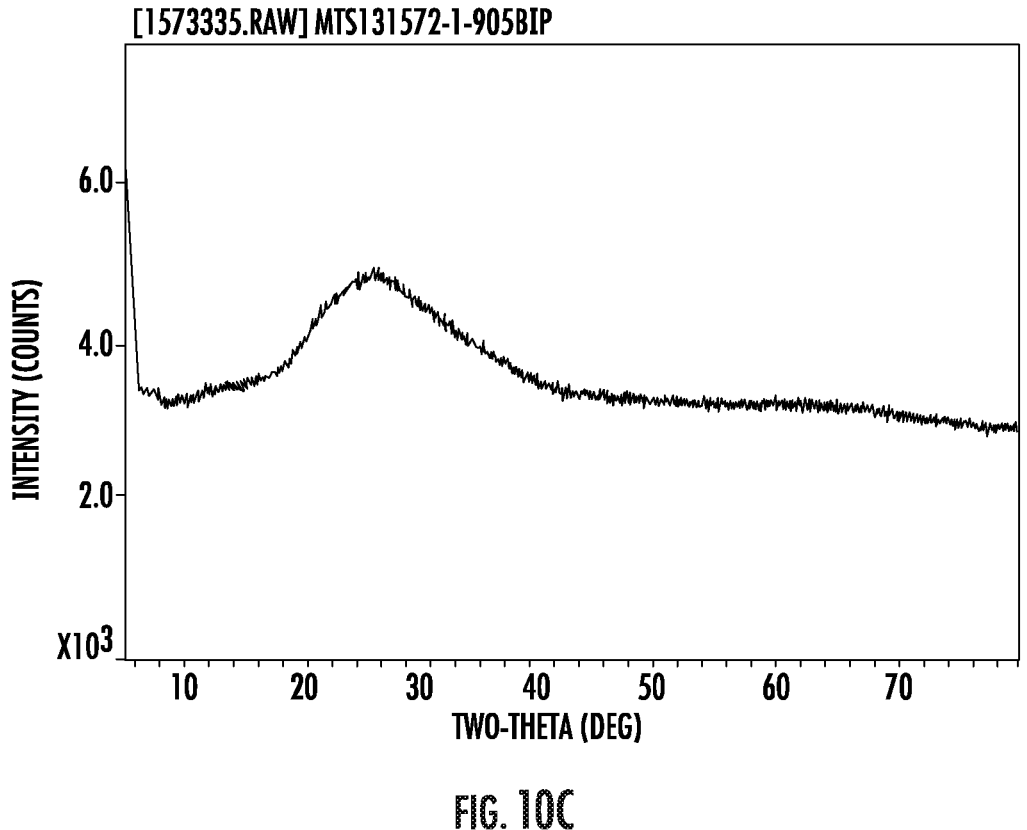
FIG. 10C is an x-ray diffraction diagram of the material of FIGS. 10A and 10B.

FIGS. 10A, 10B, and 10C show material of Example C, which was batched as 5 mol % CaO, 45 mol % $P_2O_5$, 50 mol % CuO. The digital image of FIG. 10A shows a uniformly colored sample, such as a black sample within the CIELab color ranges disclosed above. Further, the micrograph of FIG. 10B and the x-ray diffraction information in FIG. 10C show the material of Example C can be formed as a single-phase amorphous glass.

Figure 11A:
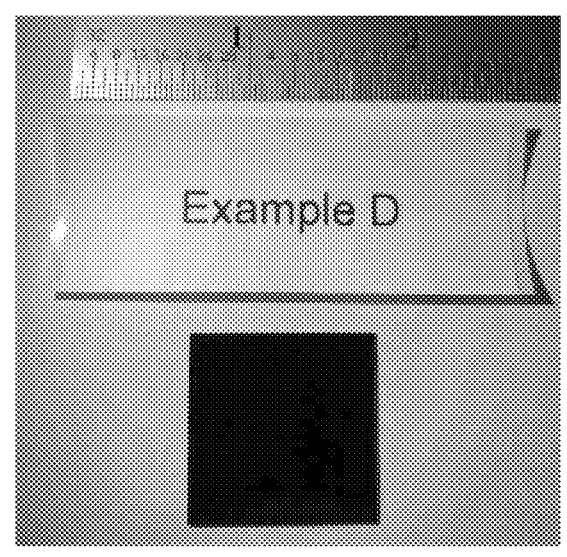
FIG. 11A is a digital image of a sample of material, corresponding to Sample D of Table 3 below, according to exemplary embodiments.
Figure 11B:
FIG. 11B is a scanning electron microscope micrograph of the sample of FIG. 11A.
Figure 11C:
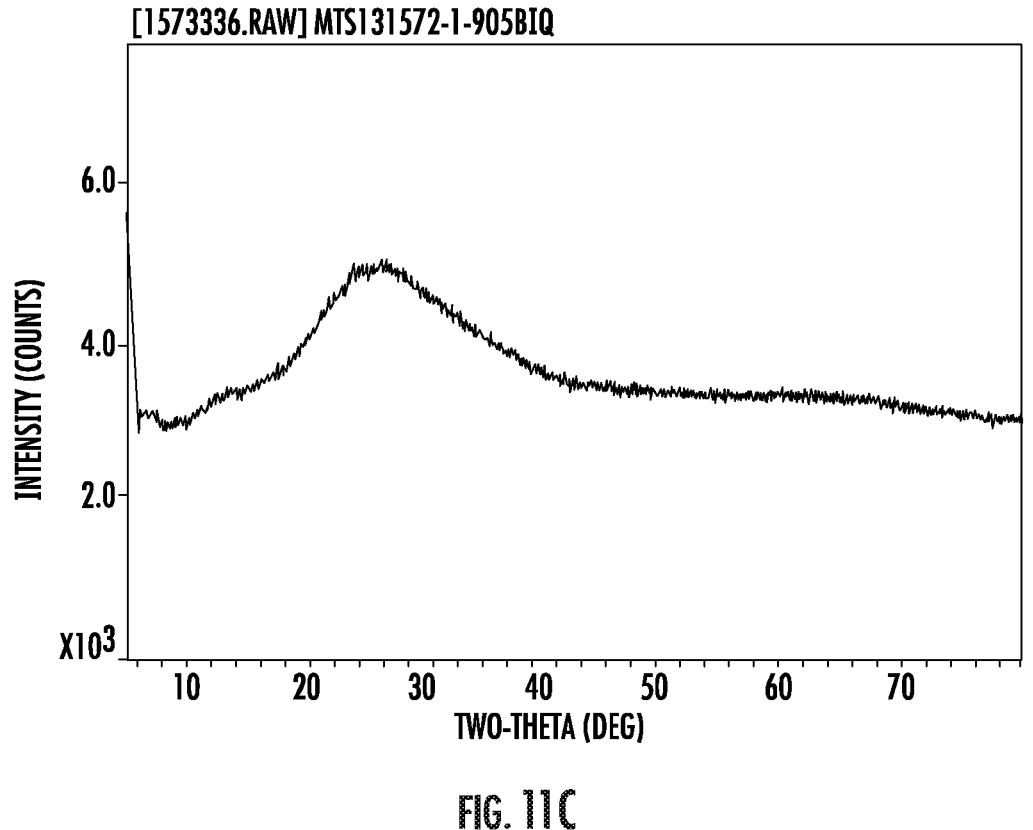
FIG. 11C is an x-ray diffraction diagram of the material of FIGS. 11A and 11B.

FIGS. 11A, 11B, and 11C show material of Example D, which was batched as 5 mol % SrO, 45 mol % $P_2O_5$, 50 mol % CuO. The digital image of FIG. 11A shows a uniformly colored sample, such as a black sample within the CIELab color ranges disclosed above. Further, the micrograph of FIG. 11B and the x-ray diffraction information in FIG. 11C show the material of Example D can be formed as a single-phase amorphous glass.

Figure 12A:
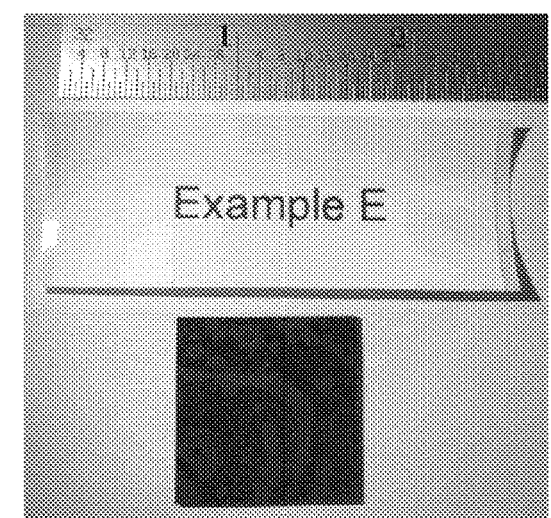
FIG. 12A is a digital image of a sample of material, corresponding to Sample E of Table 3 below, according to exemplary embodiments.
Figure 12B:
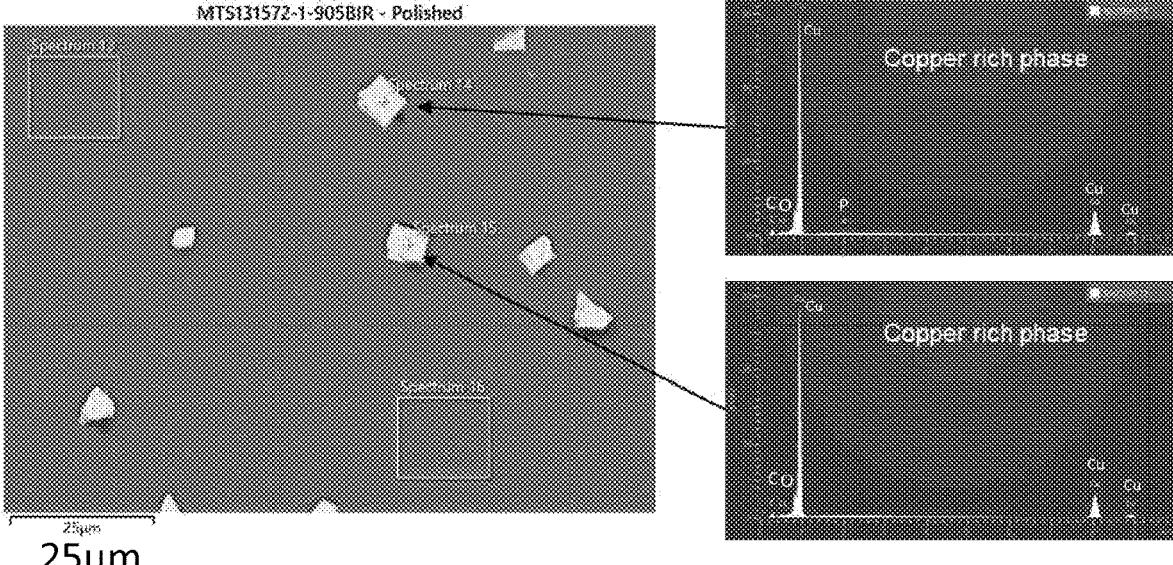
FIG. 12B is a scanning electron microscope micrograph of the sample of FIG. 12A surrounded by x-ray diffraction diagrams for locations on the image.

FIGS. 12A, 12B, and 12C, show material of Example E of Table 3, which was batched as 5 mol % BaO, 45 mol % $P_2O_5$, and 50 mol % CuO. As can be seen in the digital image of FIG. 12A, the material had a mottled coloring, such as a mix of burnt orange and black coloring. As shown in the micograph of FIG. 12B, the material included crystals or precipitates of copper-rich phase. As shown in FIG. 12C, x-ray diffraction evidences that the material of FIG. 12A is a glass-ceramic, including crystalline and glassy phases.

In embodiments, a material, such as an amorphous glass may include $P_2O_5$ in amounts as disclosed above (e.g., >30 mol %), CuO in amounts as disclosed above (e.g., >30%), and a non-zero amount of modifier oxides, such as metal oxides, such as at least 0.1 mol % (as-analyzed or as-batched) of any such oxide, at least 0.2 mol %, at least 0.5 mol %, at least 1 mol %, at least 2 mol %, at least 3 mol %, at least 4 mol %, at least 4.5 mol % and/or no more than 25 mol %, such as no more than 20 mol %, no more than 15 mol %, no more than 12.5 mol %, no more than 10 mol %, no more than 8 mol %, no more than 6 mol %, or no more than 5 mol %, such as modifier oxides may be titanium (e.g., $TiO_2$) as shown by Example I, aluminum (e.g., $Al_2O_3$, alumina) as shown by Example L, nickel (e.g., NiO) as shown by Example M, manganese (e.g., $MnO_2$) as shown by Example N, or another modifier oxide, such as another metal oxide or another amount thereof (e.g., none or more than 25 mol %). In contemplated embodiments, the composition may include more than one such oxide where the sum of the modifier oxides is in such a range.

Figure 16A:
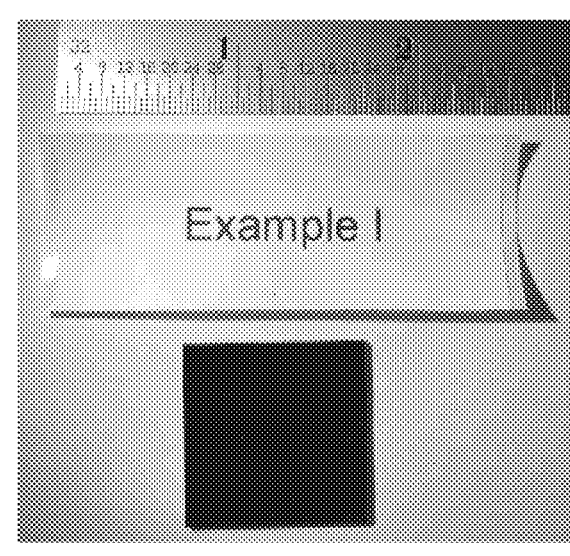
FIG. 16A is a digital image of a sample of material, corresponding to Sample I of Table 3 below, according to exemplary embodiments.
Figure 16B:
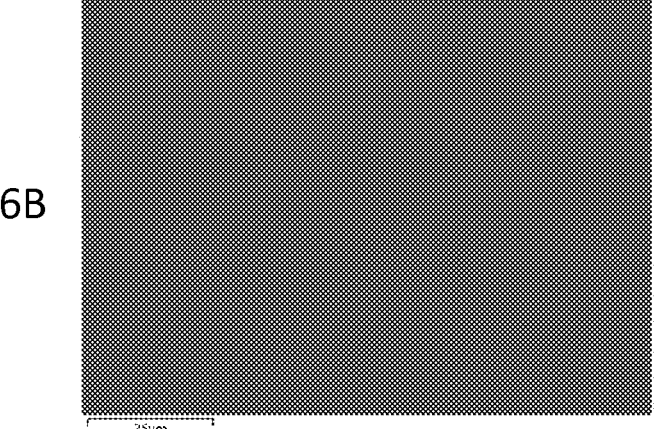
FIG. 16B is a scanning electron microscope micrograph of the sample of FIG. 16A.
Figure 16C:
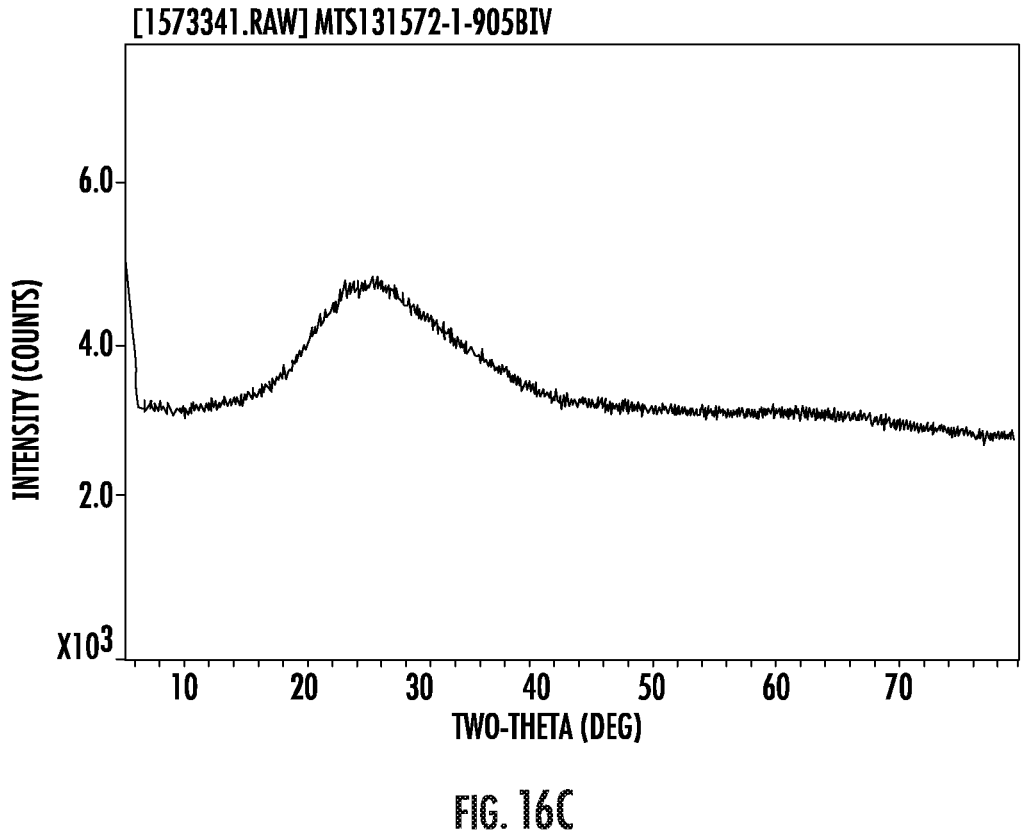
FIG. 16C is an x-ray diffraction diagram of the material of FIGS. 16A and 16B.

FIGS. 16A, 16B, and 16C show material of Example I, which was batched as 5 mol % $TiO_2$, 45 mol % $P_2O_5$, 50 mol % CuO. The digital image of FIG. 16A shows a uniformly colored sample, such as a black sample within the CIELab color ranges disclosed above. Further, the micrograph of FIG. 16B and the x-ray diffraction information in FIG. 16C show the material of Example I can be formed as a single-phase amorphous glass.

Figure 17A:
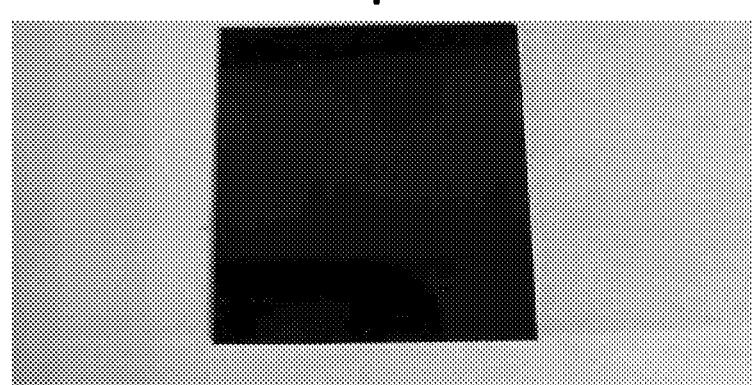
FIG. 17A is a digital image of a sample of material, corresponding to Sample L of Table 3 below, according to exemplary embodiments.
Figure 17B:
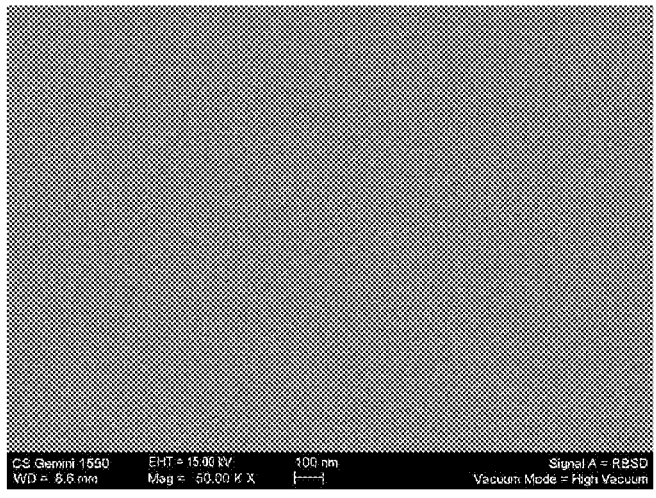
FIG. 17B is a scanning electron microscope micrograph of the sample of FIG. 17A.
Figure 17C:
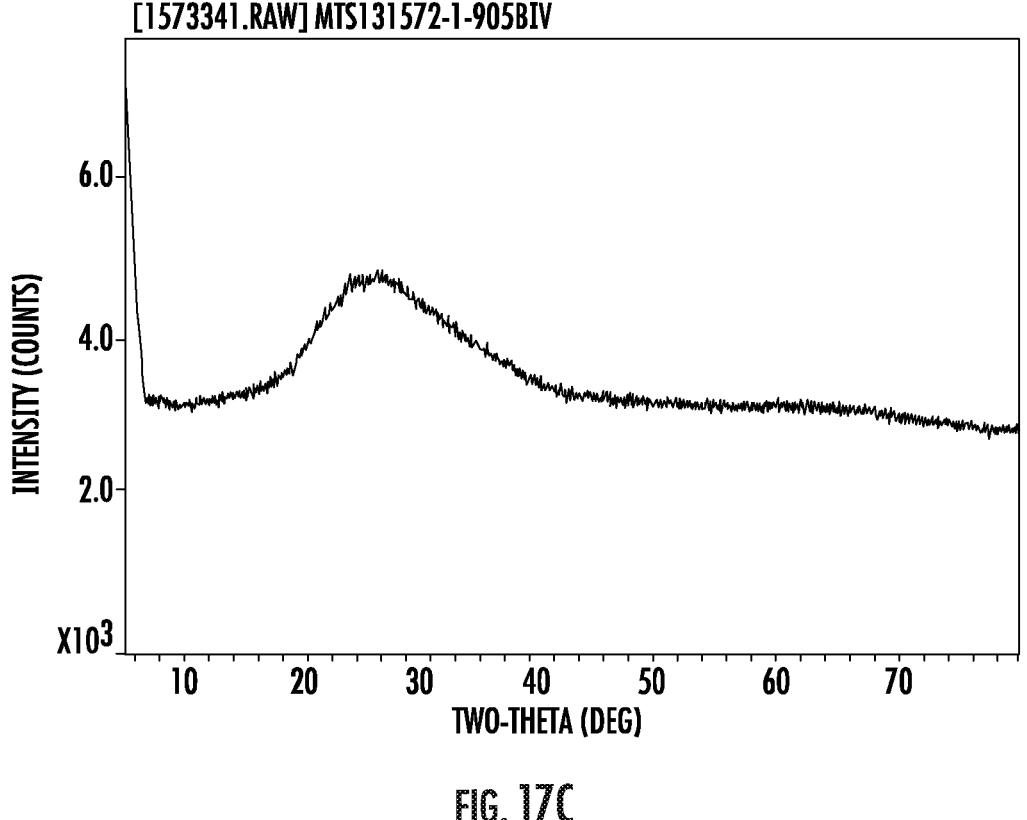
FIG. 17C is an x-ray diffraction diagram of the material of FIGS. 17A and 17B.

FIGS. 17A, 17B, and 17C show material of Example L, which was batched as 5 mol % $Al_2O_3$, 45 mol % $P_2O_5$, 50 mol % CuO. The digital image of FIG. 17A shows a uniformly colored sample, such as a black sample within the CIELab color ranges disclosed above. Further, the micrograph of FIG. 17B and the x-ray diffraction information in FIG. 17C show the material of Example L can be formed as a single-phase amorphous glass.

Figure 18A:
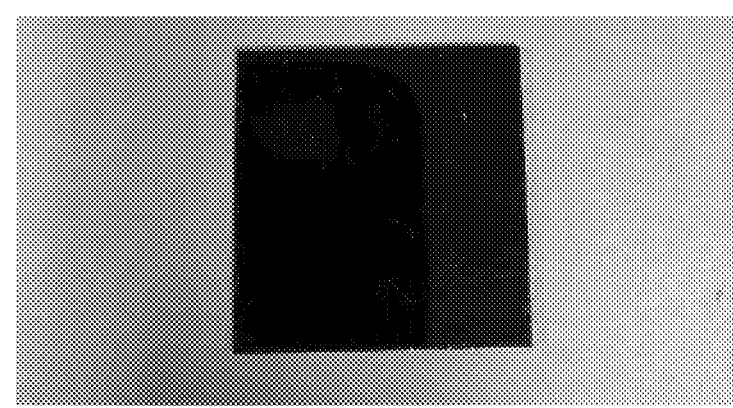
FIG. 18A is a digital image of a sample of material, corresponding to Sample M of Table 3 below, according to exemplary embodiments.
Figure 18B:
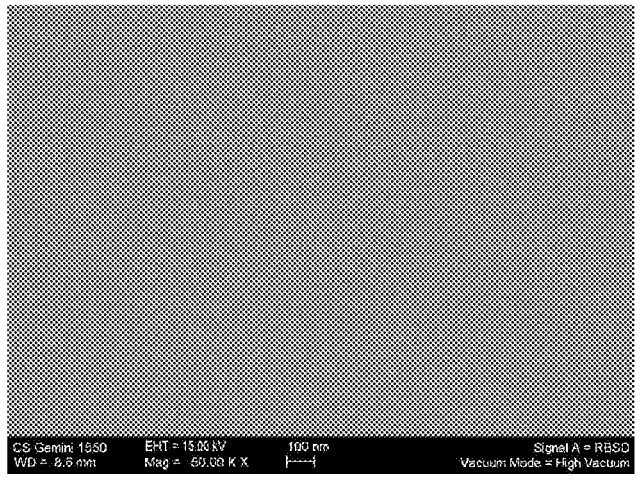
FIG. 18B is a scanning electron microscope micrograph of the sample of FIG. 18A.
Figure 18C:
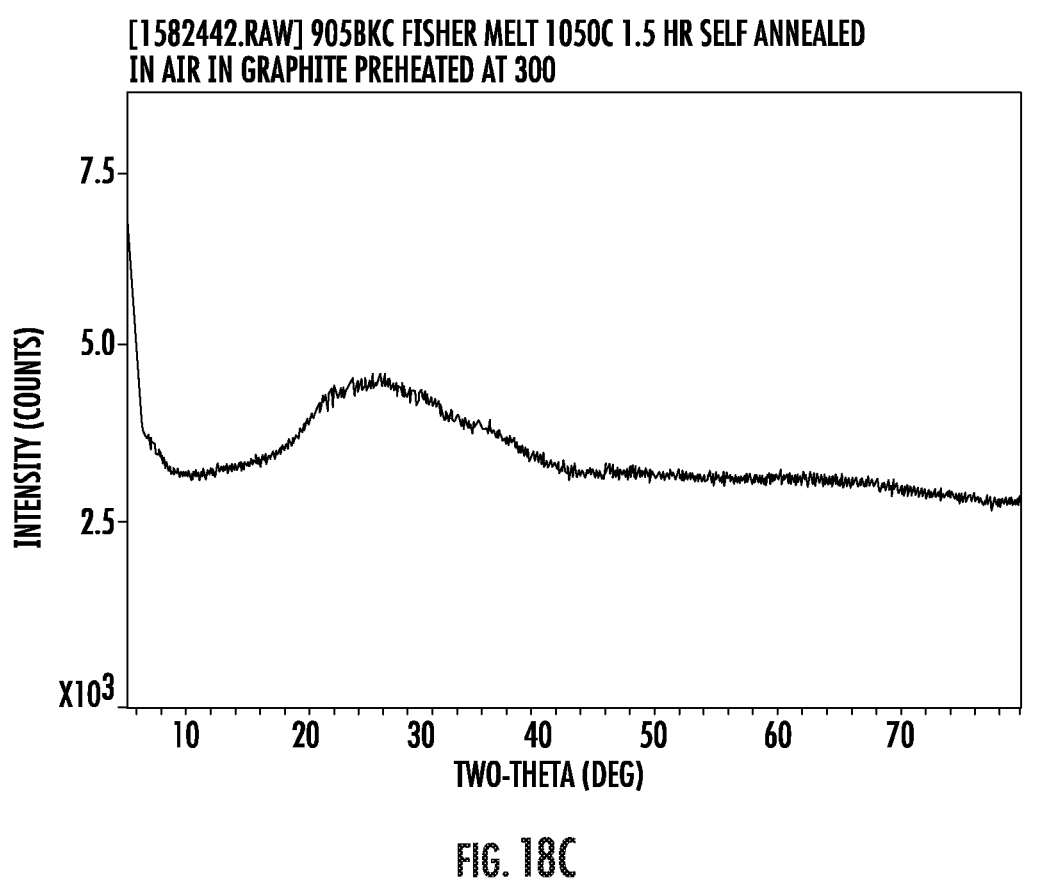

FIGS. 18A, 18B, and 18C show material of Example M, which was batched as 5 mol % NiO, 45 mol % $P_2O_5$, 50 mol % CuO. The digital image of FIG. 18A shows a uniformly colored sample, such as a black sample within the CIELab color ranges disclosed above. Further, the micrograph of FIG. 18B and the x-ray diffraction information in FIG. 18C show the material of Example M can be formed as a single-phase amorphous glass.

Figure 19A:
FIG. 19A is a digital image of a sample of material (fractured and supported by a clip), corresponding to Sample N of Table 3 below, according to exemplary embodiments.
Figure 19B:
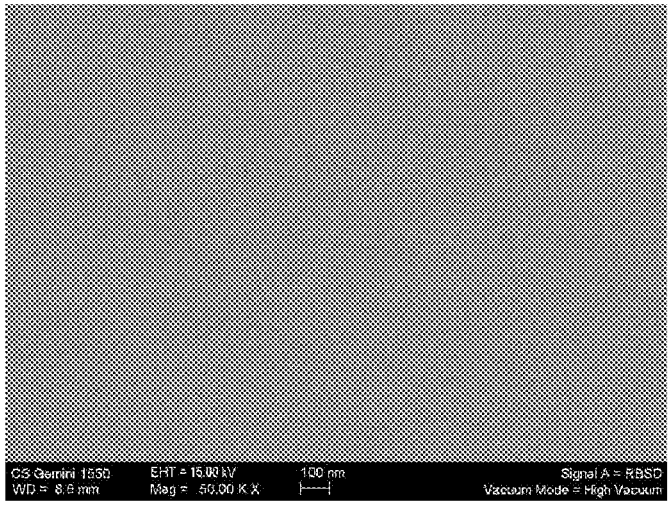
FIG. 19B is a scanning electron microscope micrograph of the sample of FIG. 19A.
Figure 19C:
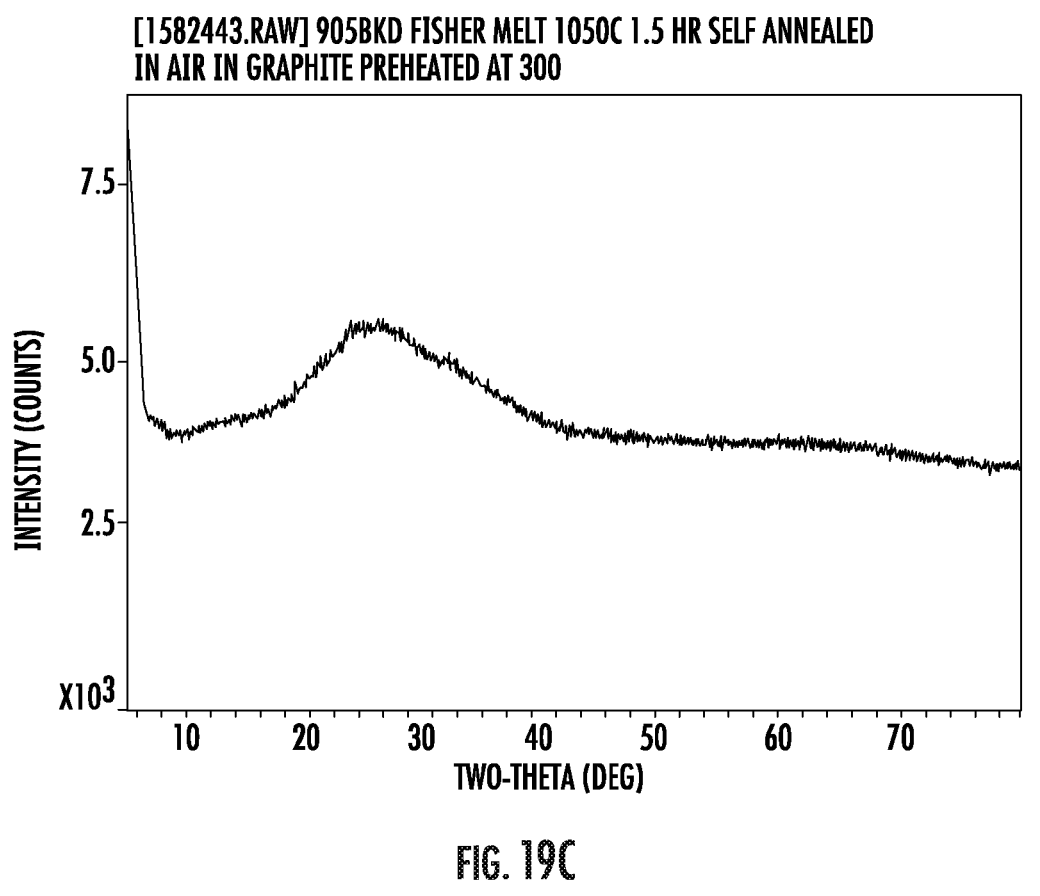

FIGS. 19A, 19B, and 19C show material of Example N, which was batched as 5 mol % $MnO_2$, 45 mol % $P_2O_5$, 50 mol % CuO. The digital image of FIG. 19A shows a uniformly colored sample, such as a black sample within the CIELab color ranges disclosed above. Further, the micrograph of FIG. 19B and the x-ray diffraction information in FIG. 19C show the material of Example N can be formed as a single-phase amorphous glass.

Examples I and J from Table 3 include $P_2O_5$ in amounts as disclosed above (e.g., >30 mol %) and CuO in amounts as disclosed above (e.g., >30%), but only further include silica ($SiO_2$) and not any other modifier or metal oxides. The log kill and % kill data in Table 3 shows that such materials are effective antimicrobial materials, but not as effective at killing or inhibiting microbes as other materials disclosed herein. Accordingly, in embodiments the material includes $P_2O_5$ and CuO in substantial amounts, as disclosed above, and further includes a modifier oxide other than or in addition to silica, such as a metal oxide, where that modifier oxide may be an oxide of iron, zinc, an alkaline earth metal, an alkali metal, titanium, aluminum, nickel, manganese, or other elements, oxides, or compounds, as may contribute other metals or constituents to improve the antimicrobial performance, color, strength, or other properties.

Applicants have found that certain modifiers in the composition, as disclosed herein, affect chemical dissolution behavior and staining that may be caused by normal wear (fingerprints, disinfectants, etc.) uses of the materials as cover glasses, antimicrobial plates, frit, etc., and that the compositional options disclosed herein exhibit full kill for various design needs. Further, as mentioned above, embodiments are phosphate glasses that may be formed and machined under normal atmospheric conditions, which allows for compatibility in various existing manufacturing and assembly processes.

For clarity, copper constituent in embodiments is listed as CuO herein by the convention of defining the composition in terms of a representative or common-oxide constituent for a particular elemental component, such as with respect to mol % of all various oxides of copper (e.g., CuO, $CuO_2$) in materials disclosed herein, including amorphous, single-phase glass. Similarly, oxides of iron are listed as $Fe_2O_3$ herein by this convention, as well as other constitutes, but various oxidation states of iron may be present in the given molar percentages listed. Notably, many materials disclosed herein contain at least two multivalent elemental species, such as iron and copper, and oxidation-reduction (redox) of species may be difficult to breakdown at least because of different multivalent species. So, unless otherwise expressly specified in claims or elsewhere herein, this convention is used.

With that said, Applicants believe that copper redox reaction may influence antimicrobial and/or antiviral effectiveness of the materials, where efficacy of copper ions decreases with increasing oxidation state such that $Cu^0$ performs better than $Cu^{1+}$, which performs better than $Cu^{2+}$. According to contemplated embodiments, at least 0.1% of copper of the material (generally listed as CuO or cupric oxide herein above) is at $Cu^{1+}$ and/or $Cu^0$ oxidation state, such as at least 1%, at least 2%, at least 4%, at least 7%, at least 10%, at least 20%, at least 30%, at least 40%, at least 50%, at least 60%, at least 70%, at least 80%, at least 90%, and/or no more than 99.999%, such as no more than 99.9%, no more than 99%, no more than 98%, no more than 95%, no more than 90%, no more than 80%, no more than 70%, no more than 60%, or no more than 50% percent of all molar copper in the material. According to contemplated embodiments, the ratio of $Cu^{+1}$ to $Cu^{+2}$ is at least 0.01, such as at least 0.02, at least 0.04, at least 0.075, at least 0.1, at least 0.15, at least 0.2, at least 0.3, at least 0.33, 0.5, 0.75, 1, 2, 5, 10, and/or no more than 200, such as no more than 100, no more than 70, no more than 20, no more than 10, no more than 6.6, no more than 5, no more than 3, no more than 2, no more than 1:1, no more than 0.9, no more than 0.7, or no more than 0.5 in contemplated embodiments. Applicants contemplate that the state of each species may be determined individually using Mossbauer spectroscopy.

Applicants have found that the process of annealing embodiments herein not only influences relaxation of internal stresses of the materials, but also internal microstructure. Annealing amorphous, single-phase glasses disclosed herein by conventional or standard annealing practices, such as returning the glasses to an oven and adding heat, and then lowering the temperature over time, may result in formation of crystals within the glass, converting the glass to a glass-ceramic. But, pre-heating a graphite mold or other receptacle with comparable thermodynamic properties and then adding newly formed amorphous or single-phase glass of the present disclosure to the receptacle (e.g., pouring in or placing on the receptacle) and allowing the glass to cool along with the pre-heated receptacle in open atmospheric conditions allows the glass to anneal, reducing residual stresses while still allowing the glass to remain amorphous and single-phase. As such, compositions disclosed herein as amorphous and single-phase, such as examples in Tables above, may also be annealed conventionally or purposely heat treated to grow a crystalline phase and convert the glass to a glass-ceramic, or may be annealed as disclosed and to be amorphous and single-phase glass, such as glass articles as disclosed.

Each of U.S. Application Nos. 63/023,518 filed May 12, 2020, 17/327,870 filed May 24, 2021, 63/088,525 filed Oct.

7, 2020, 17/068,272 filed Oct. 12, 2020, 63/136,381 filed Jan. 12, 2021, 63/151,210 filed Feb. 19, 2021, 63/177,536 filed Apr. 21, 2021, 63/209,489 filed May 11, 2021, 63/123, 863 filed Dec. 10, 2020, 63/183,292 filed May 3, 2021, 63/183,271 filed May 3, 2021, and 63/222,462 filed Jul. 16, 2021 is incorporated by reference herein in its entirety. Each of U.S. Application Nos. 63/030,719 filed May 27, 2020, 17/331,050 filed May 26, 2021, 63/024,835 filed May 14, 2020, 17/319,538 filed May 13, 2021, and 63/009,102 filed Apr. 13, 2020 is incorporated by reference herein in its entirety. International application No. PCT/US21/24605 filed Mar. 29, 2021 is incorporated by reference herein in its entirety.

Construction and arrangements of the compositions, structures, assemblies, and structures, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Materials disclosed herein may be useful for purposes other than controlling microbes, such as forming substrates, packaging, containers, covers, etc. The order or sequence of any process, logical algorithm, or method steps may be varied or re-sequenced according to exemplary embodiments. Other substitutions, modifications, changes and omissions may also be made in the design, operating conditions and arrangement of the various exemplary embodiments without departing from the scope of the present inventive technology.

What is claimed is:

1. A method of making a material, the method comprising:
   melting a batch mixture comprising:
      $0 < SiO_2 \leq 35$ mol %;
      $30$ mol % $\leq P_2O_5 \leq 65$ mol %, and
      $25$ mol % $\leq CuO \leq 55$ mol %;
   mixing the melt;
   cooling the mixture to form a glass, and
   annealing the glass without growing crystals in the glass such that the annealed glass is amorphous, single-phase.

2. The method of claim 1, further comprising machining the glass in open air at atmospheric pressure and at temperature within 50 degrees of 0° C.

3. The method of claim 1, wherein the batch mixture further comprises 5 mol % $\leq Fe_2O_3 \leq 15$ mol.

4. The method of claim 1, wherein the batch mixture comprises 40 mol % $\leq CuO \leq 55$ mol %.

5. The method of claim 1, wherein the glass exhibits a percent kill of at least 75 as measured by United States EPA Test Method for Efficacy of Copper Alloy Surfaces as a Sanitizer.

6. The method of claim 1, wherein the glass exhibits a CIELAB L* value below 35.

7. A method of making a material, the method comprising:
   melting a batch mixture comprising:
      $30$ mol % $\leq P_2O_5 \leq 65$ mol %,
      $40$ mol % $\leq CuO \leq 55$ mol %; and
      $3$ mol % $\leq Fe_2O_3 \leq 15$ mol %
   mixing the melt; and
   cooling the mixture to form a glass.

8. The method of claim 7, further comprising machining the glass in open air at atmospheric pressure and at temperature within 50 degrees of 0° C.

9. The method of claim 7, wherein the batch mixture further comprises 5 mol %≤$Fe_2O_3$≤15 mol.

10. The method of claim 7, wherein the glass exhibits a percent kill of at least 75 as measured by United States EPA Test Method for Efficacy of Copper Alloy Surfaces as a Sanitizer.

11. The method of claim 7, wherein the glass exhibits a CIELAB L* value below 35.

12. A method of making a material, the method comprising:
  melting a batch mixture comprising:
    30 mol %≤$P_2O_5$≤65 mol %, and
    25 mol %≤CuO≤55 mol %;
    3 mol %≤X≤15 mol %, wherein X is $Fe_2O_3$;
  mixing the melt;
  cooling the mixture to form a glass, and
  annealing the glass without growing crystals in the glass such that the annealed glass is amorphous, single-phase.

13. The method of claim 12, wherein the glass exhibits a percent kill of at least 75 as measured by United States EPA Test Method for Efficacy of Copper Alloy Surfaces as a Sanitizer.

14. The method of claim 12, wherein the glass exhibits a CIELAB L* value below 35.

15. The method of claim 12, further comprising machining the glass in open air at atmospheric pressure and at temperature within 50 degrees of 0° C.

16. The method of claim 12, wherein the batch mixture comprises 40 mol %≤CuO≤55 mol %.

17. A method of making a material, the method comprising:
  melting a batch mixture comprising:
    0<$SiO_2$≤35 mol %;
    30 mol %≤$P_2O_5$≤65 mol %;
    25 mol %≤CuO≤55 mol %; and
    3 mol %≤$Fe_2O_3$≤15 mol %;
  mixing the melt; and
  cooling the mixture to form a glass.

18. The method of claim 17, wherein the glass exhibits a percent kill of at least 75 as measured by United States EPA Test Method for Efficacy of Copper Alloy Surfaces as a Sanitizer.

19. The method of claim 17, wherein the glass exhibits a CIELAB L* value below 35.

20. The method of claim 17, further comprising machining the glass in open air at atmospheric pressure and at temperature within 50 degrees of 0° C.

* * * * *